(12) United States Patent
Kodama et al.

(10) Patent No.: US 11,435,316 B2
(45) Date of Patent: Sep. 6, 2022

(54) MAGNETIC BODY MANAGEMENT SYSTEM AND MAGNETIC BODY MANAGEMENT METHOD

(71) Applicant: Shimadzu Corporation, Kyoto (JP)

(72) Inventors: Hiroaki Kodama, Kyoto (JP); Mitsuo Yamashita, Kyoto (JP); Satoshi Akasegawa, Kyoto (JP); Taketoshi Noji, Kyoto (JP); Yoshio Takami, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 4 days.

(21) Appl. No.: 17/283,209

(22) PCT Filed: Oct. 16, 2018

(86) PCT No.: PCT/JP2018/038457
§ 371 (c)(1),
(2) Date: Apr. 6, 2021

(87) PCT Pub. No.: WO2020/079747
PCT Pub. Date: Apr. 23, 2020

(65) Prior Publication Data
US 2021/0382008 A1 Dec. 9, 2021

(51) Int. Cl.
*G01N 27/82* (2006.01)
(52) U.S. Cl.
CPC .................................. *G01N 27/82* (2013.01)
(58) Field of Classification Search
CPC ........ G01N 27/82; G01N 27/72; G01N 27/83; G06Q 10/083; G06Q 10/00
See application file for complete search history.

(56) References Cited

U.S. PATENT DOCUMENTS

| 6,492,808 B1 | 12/2002 | Sukhorukov et al. |
| 2014/0035569 A1* | 2/2014 | Yoshioka ............... G01N 27/82 324/242 |

(Continued)

FOREIGN PATENT DOCUMENTS

| CN | 107764893 A | 3/2018 |
| CN | 108562639 A | 9/2018 |

(Continued)

OTHER PUBLICATIONS

Office Action dated Jun. 3, 2022 for corresponding Korean Patent Application No. KR 10-2021-7004375 submitted with a machine translation.

(Continued)

*Primary Examiner* — Dominic E Hawkins
(74) *Attorney, Agent, or Firm* — Muir Patent Law, PLLC

(57) ABSTRACT

This magnetic body management system (100) includes: a first magnetic body inspection device (1) configured to acquire a detection signal (DS) before the magnetic body (MM) is installed at a location of use; a second magnetic body inspection device (2) configured to acquire a detection signal (DS) after the magnetic body (MM) has been installed at the location of use, the second magnetic body inspection device (2) having the same method as that of the first magnetic body inspection device (1); a server (3); a first transmission unit (4); and a second transmission unit (5). The server (3) is configured to estimate a deterioration state of the magnetic body (MM) based on at least the first magnetic body information (10) and the second magnetic body information (11).

11 Claims, 12 Drawing Sheets

(56) References Cited

U.S. PATENT DOCUMENTS

| | | | | |
|---|---|---|---|---|
| 2017/0108469 A1* | 4/2017 | Timmons | ............... | G01N 27/83 |
| 2019/0106318 A1* | 4/2019 | Dudley | ................... | B60P 3/228 |
| 2020/0284938 A1* | 9/2020 | Chaturvedi | ............ | G01V 15/00 |

FOREIGN PATENT DOCUMENTS

| | | |
|---|---|---|
| EP | 1923700 B1 | 12/2013 |
| JP | H01147360 A | 6/1989 |
| JP | 5044545 A | 7/2012 |
| JP | 2018004555 A | 1/2018 |
| MY | 150395 A | 1/2014 |

OTHER PUBLICATIONS

Written Opinion for PCT application No. PCT/JP2018/038457 dated Jan. 15, 2019, submitted with a machine translation.

"Report on Examination Certification of Construction Mechanization Technology and Construction Technology" with a machine translation Requested by: Tokyo Seiko Co., Ltd. Name of technology: Wire rope constant remote diagnosis technology (SEMSOR) (Nov. 2009).

"General maintenance system for wire ropes SEMSOR catalog" submitted with a machine translation, downloaded Jun. 29, 2017.

Extended European Search Report (EESR) dated May 3, 2022 for the corresponding European patent application No. 18937229.5.

\* cited by examiner

FIG. 1
First Embodiment
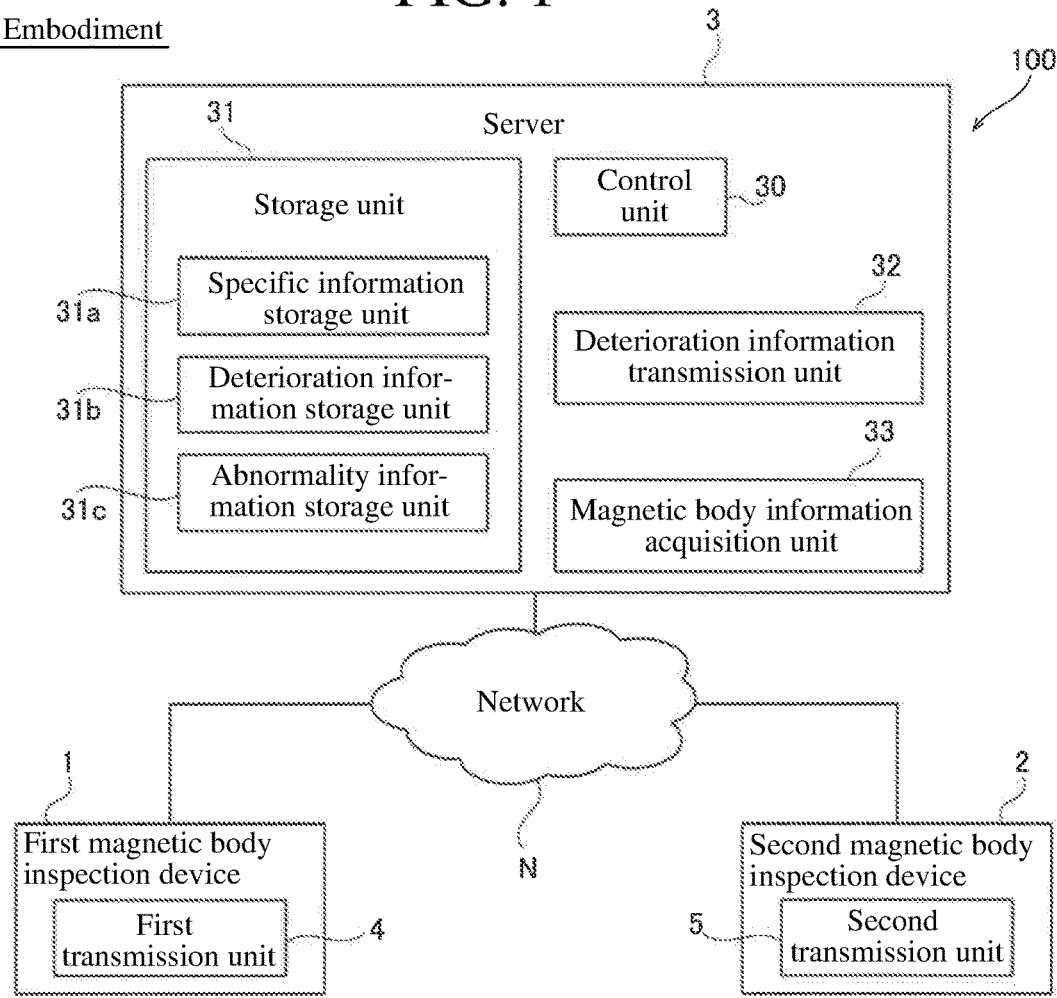
FIG. 2
First Embodiment
(A) Shipping location
(B) Location of use
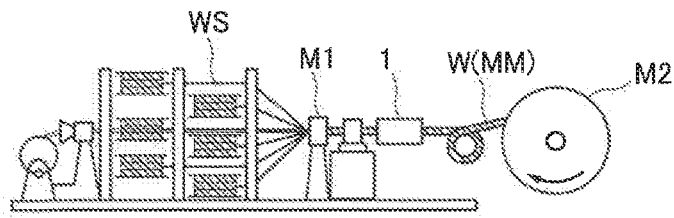
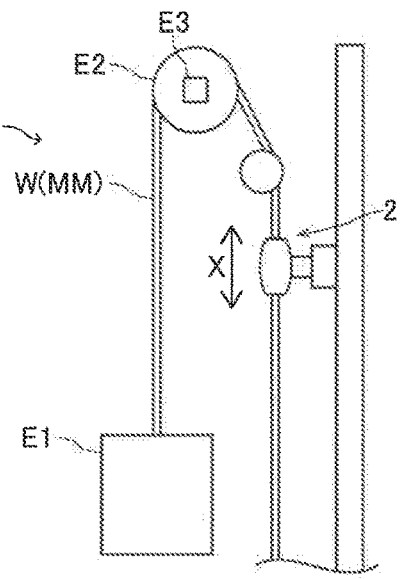

First Embodiment

First Embodiment

First Embodiment

First Embodiment

First Embodiment

FIG. 8
First Embodiment
(A) First detection signal
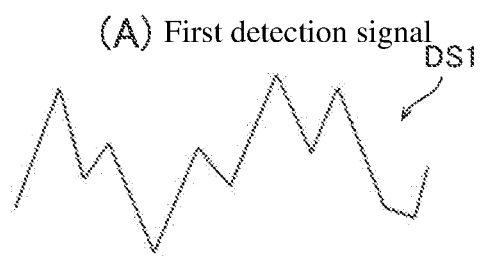
(B) Second detection signal
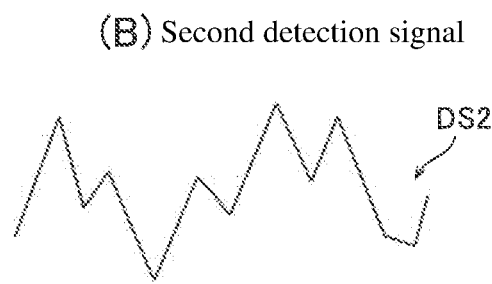
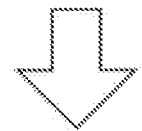
(C) Differential waveform

First Embodiment

FIG. 10
First Embodiment
(A) First magnetic body information
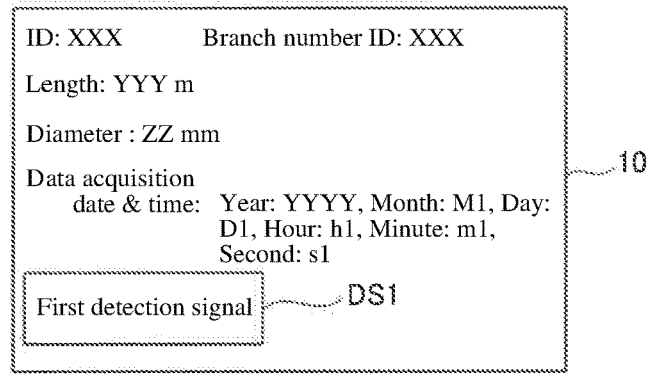
(B) Second magnetic body information
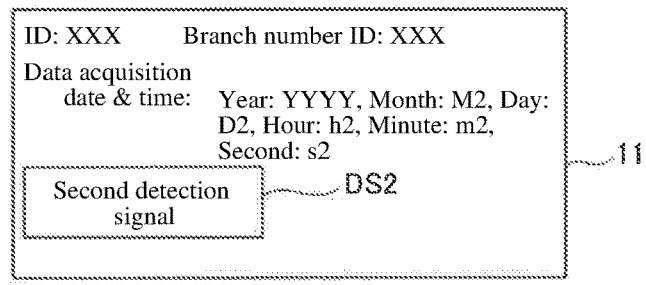
(C) Magnetic body deterioration information
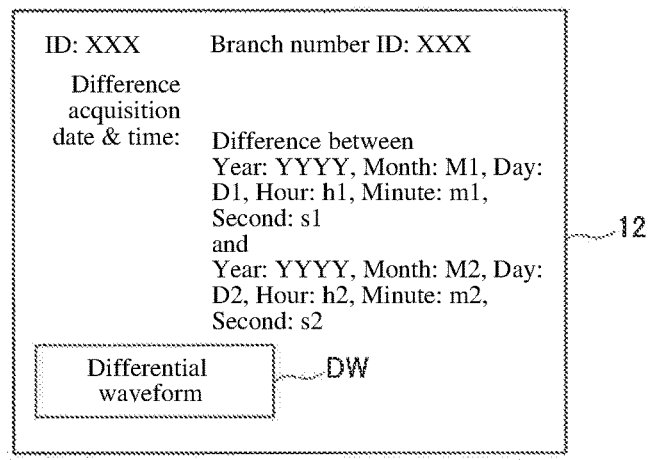

First embodiment

Second Embodiment

FIG. 15
First Modification
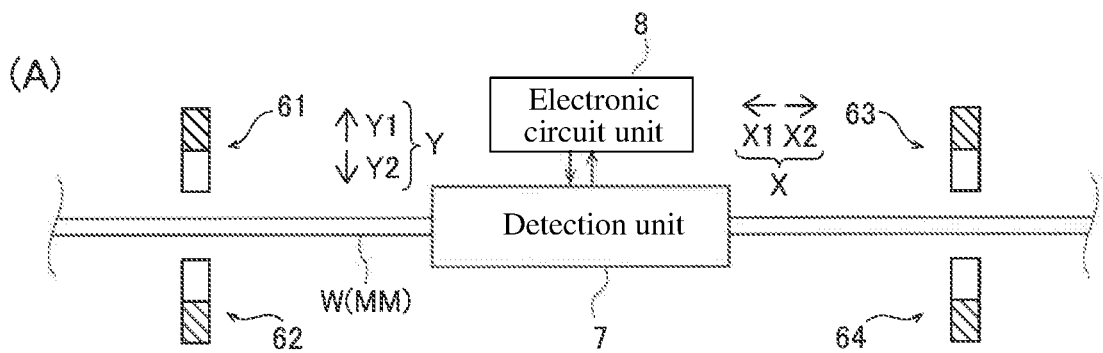
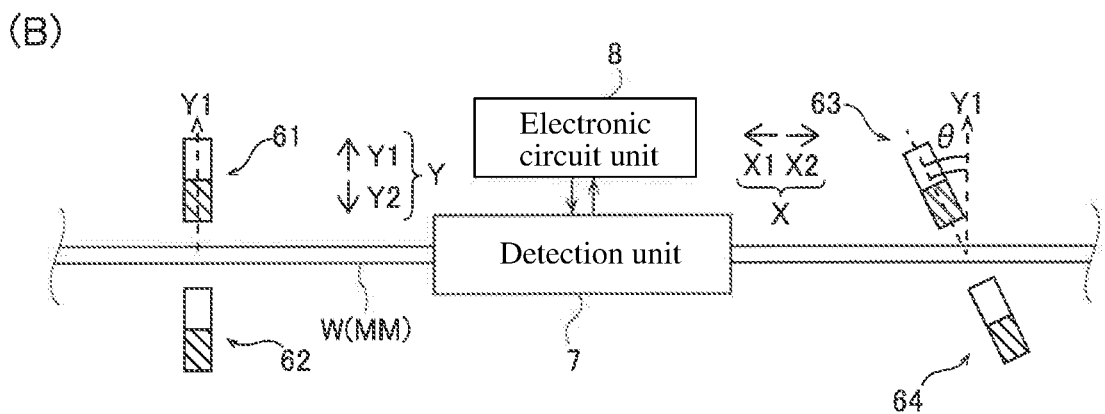
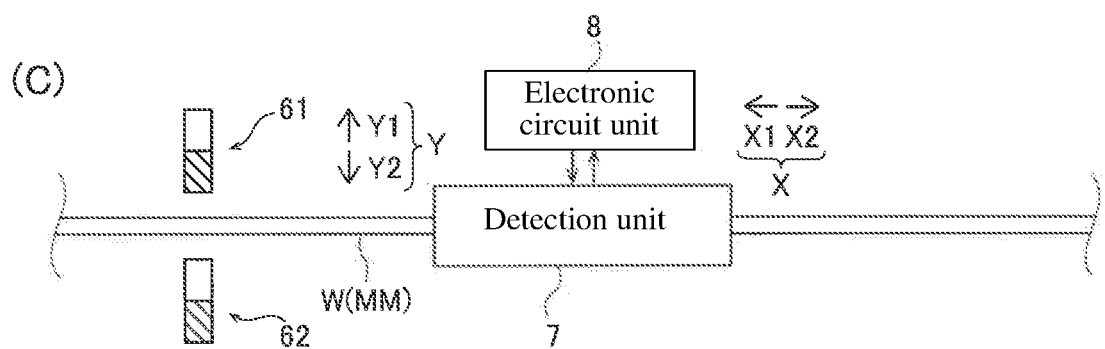

FIG. 16
Second Modification
(A)
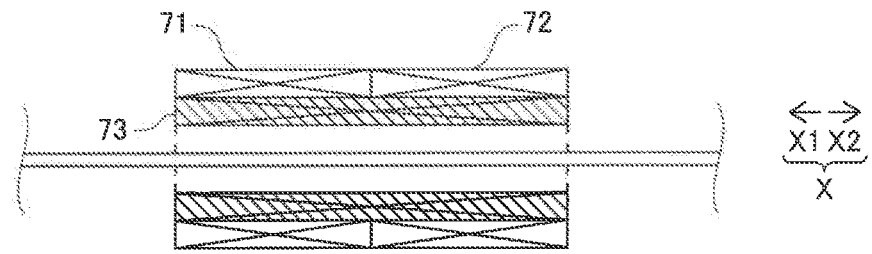
(B)
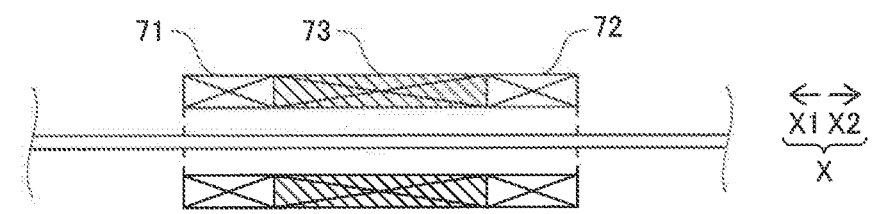
(C)
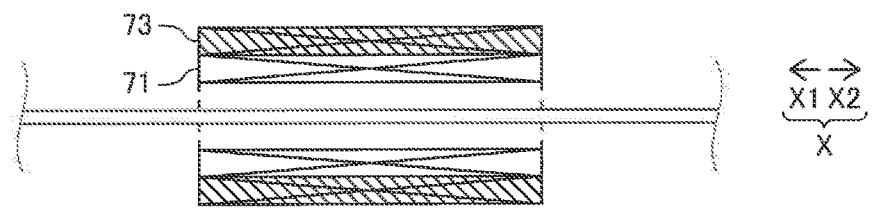
(D)
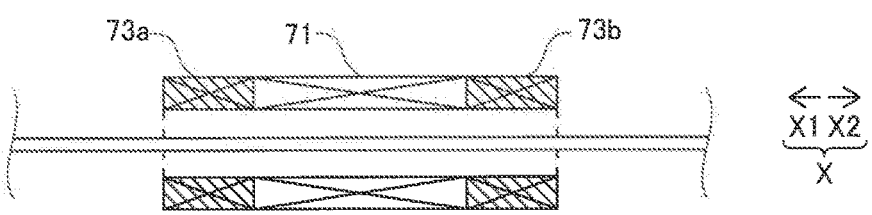
(E)
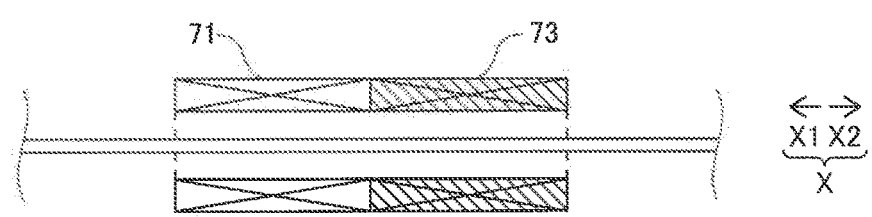
(F)
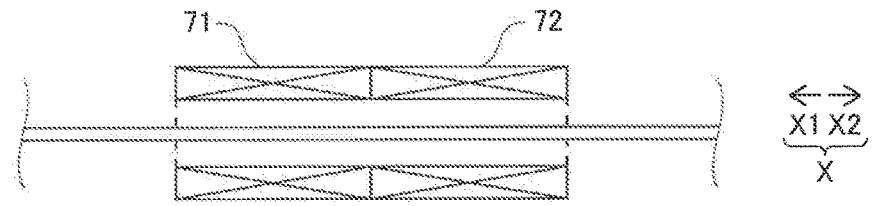

MAGNETIC BODY MANAGEMENT SYSTEM AND MAGNETIC BODY MANAGEMENT METHOD

TECHNICAL FIELD

The present invention relates to a magnetic body management system and a magnetic body management method, and more particularly to a magnetic body management system and a magnetic body management method for acquiring a deterioration state of the magnetic body by inspecting the magnetic body over time.

BACKGROUND ART

Conventionally, a magnetic body management system and a magnetic body management method for acquiring a deterioration state of a magnetic body by inspecting the magnetic body over time are known. Such a magnetic body management system and a magnetic body management method are disclosed, for example, in Japanese Patent No. 5044545.

The magnetic body management system disclosed in the above-described Japanese Patent No. 5044545 is provided with a measuring means for measuring a state of a magnetic body, a first monitoring device, and a second monitoring device. The first monitoring device is connected to the measuring means by a communication means and is configured to store measurement data output from the measuring means. Further, the first monitoring device is configured to determine the state of the magnetic body based on the acquired measurement data and the already stored measurement data and to transmit the determination data to the second monitoring device when there is an error. The second monitoring device is configured to check the determination data transmitted from the first monitoring device again, perform a final determination, and transmit the result of the final determination to the first monitoring device. Note that the magnetic body management system disclosed in the above-described Japanese Patent No. 5044545 acquires the deterioration state of a wire rope as a magnetic body. More specifically, the magnetic body management system disclosed in the above-described Japanese Patent No. 5044545 acquires a deterioration state of a wire rope installed on a crane and the like.

PRIOR ART DOCUMENT

Patent Document

Patent Document 1: Japanese Patent No. 5044545

SUMMARY OF THE INVENTION

Problems to be Solved by the Invention

However, the configuration disclosed in the above-described Japanese Patent No. 5044545 is configured to accumulate the measurement data acquired by measuring the state after the installation of the wire rope on the crane or the like. Therefore, measurement data to be accumulated does not include data that measured the change of the state of the wire rope that occurred before the installation of the wire rope, e.g., during the wire rope transportation. As a result, the quality of the measurement data to be accumulated deteriorates, and therefore the accuracy of the state determination of the magnetic body deteriorates.

The present invention has been made in order to solve the above-described problems, and an object of the present invention is to provide a magnetic body management system and a magnetic body management method capable of suppressing deterioration in the quality of measurement data to be accumulated and suppressing deterioration in the accuracy of a condition determination of the magnetic body.

Means for Solving the Problem

In order to attain the above-described objects, a magnetic body management system according to the first aspect of the present invention, includes: a first magnetic body inspection device configured to acquire a detection signal based on a magnetic field of a magnetic body or a change in the magnetic field before the magnetic body is installed at a location of use; a second magnetic body inspection device configured to acquire the detection signal of the magnetic body after the magnetic body has been installed at the location of use, the second magnetic body inspection device having the same method as that of the first magnetic body inspection device; a server configured to store information of the magnetic body; a first transmission unit configured to transmit first magnetic body information in which the detection signal acquired by the first magnetic body inspection device and an identifier of the magnetic body are linked; and a second transmission unit configured to transmit second magnetic body information in which the detection signal acquired by the second magnetic body inspection device and the identifier of the magnetic body are linked. The server is configured to estimate a deterioration state of the magnetic body based on at least the first magnetic body information and the second magnetic body information. Note that the change in the magnetic field is a broad concept, including the temporal change in the magnetic field strength detected by the magnetic body inspection device by relatively moving the magnetic body and the magnetic body inspection device and the temporal change in the magnetic field strength detected by the magnetic body inspection device by changing the magnetic field applied to the magnetic body over time.

The magnetic body management system according to the first aspect of the present invention is provided with, as described above, the first magnetic body inspection device, the second magnetic body inspection device, the server, the first transmission unit, and the second transmission unit. The server is configured to estimate the deterioration state of the magnetic body based on at least the first magnetic body information and the second magnetic body information. With this configuration, at the shipping location and at the location of use, it is possible to acquire measurement data using the first magnetic body inspection device and the second magnetic body inspection device of the same method. Therefore, it is possible to accumulate not only the measurement data at the location of use but also the measurement data at the shipping location. As a result, it is possible to suppress the deterioration of the quality of the measurement data to be accumulated and also possible to suppress the deterioration of the accuracy of the status determination of the magnetic body. Further, it becomes possible to acquire consistent time-series data from the shipping location to the location of use. Therefore, it is possible to obtain useful data that provides new insights for improving each process, such as, e.g., a production process, a storing management process, a transportation process, and an installation process.

In the magnetic body management system according to the first aspect of the present invention, preferably, the server is configured to estimate the deterioration state of the magnetic body by acquiring a differential waveform of the first magnetic body information and the second magnetic body information. With this configuration, the differential waveform of the first magnetic body information and the second magnetic body information is acquired, and therefore the change in the deterioration state of the magnetic body caused during the transportation from the shipping location to the location of use can be obtained. Consequently, it becomes possible to acquire the change in the deterioration state of the magnetic body at the shipping location, during the transportation, and at the location of use, which ensures the traceability of the magnetic body. Note that in the present invention, the term "damage" of the magnetic body is a broad concept, including a change in a cross-sectional area (including a change caused by a gap when damage or the like has occurred inside a magnetic body) with respect to a detection direction generated in the magnetic body, a change in the magnetic permeability caused by the rust of the magnetic body, weld burning, mixture of impurities, compositional changes, or the like, and a portion in which the magnetic body becomes non-uniform.

In the magnetic body management system according to the first aspect of the present invention, preferably, the server is configured to store, when estimating the deterioration state of the magnetic body, waveform information of the detection signal in the second magnetic body information when it is estimated that damage has occurred in the magnetic body as abnormality information. With this configuration, it becomes possible to accumulate the abnormality information, so that the algorithms for estimating the deterioration state of the magnetic body can be updated based on the accumulated abnormality information. Consequently, the estimation accuracy of the deterioration state of the magnetic body can be improved.

In acquiring the differential waveform by the server, preferably, the server further includes a deterioration information transmission unit for transmitting the deterioration information of the magnetic body including at least the differential waveform, in response to a request from at least one of the first magnetic body inspection device and the second magnetic body inspection device. With this configuration, the first magnetic body inspection device and the second magnetic body inspection device can acquire the differential waveform by requesting the server from the first magnetic body inspection device and the second magnetic body inspection device. As a result, the change in the deterioration state of the magnetic body can be grasped based on the differential waveform at each of the shipping location and at the location of use, so that it is possible to grasp the timing at which the change in the deterioration state of the magnetic body has occurred.

In the magnetic body management system according to the first aspect of the present invention, preferably, the first transmission unit and the second transmission unit are included in the first magnetic body inspection device and the second magnetic body inspection device, respectively, or included in a device other than the first magnetic body inspection device and the second magnetic body inspection device, and are configured to transmit at least the first magnetic body information and the second magnetic body information, respectively, to the server via a network. With this configuration, in a case where the first transmission unit and the second transmission unit are included in the first magnetic body inspection device and the second magnetic body inspection device, respectively, it is possible to directly transmit the first magnetic body information and the second magnetic body information from the first magnetic body inspection device and the second magnetic body inspection device directly, respectively, to the server. Therefore, it is possible to suppress that the configuration of the system becomes complicated. Further, in a case where the first transmission unit and the second transmission unit are included in a device (e.g., a personal computer) other than the first magnetic body inspection device and the second magnetic body inspection device, the first magnetic body inspection device and the second magnetic body inspection device do not need to be equipped with information transmitting functions (first transmission unit and second transmission unit). Further, the first magnetic body inspection device and the second magnetic body inspection device can be used even where they cannot be connected to a network. As a result, the flexibility of the system can be improved.

In the magnetic body management system according to the first aspect of the present invention, preferably, the first magnetic body inspection device and the second magnetic body inspection device each include: a magnetic field application unit configured to align a magnetization direction of the magnetic body before performing detection of the detection signal; a detection unit configured to output the detection signal in which the magnetization direction is aligned by the magnetic field application unit; an output unit configured to output the detection signal; and a deterioration information acquisition unit configured to acquire information of the deterioration state of the magnetic body. With this configuration, since the first magnetic body inspection device and the second magnetic body inspection device are each provided with a magnetic field application unit, the noise of the detection signal can be reduced. This makes it possible to improve the accuracy of the detection signal, which in turn can improve the reproducibility of the detection signal detected between the devices. As a result, since the acquired detection signal is highly reproducible, even in cases where the first magnetic body inspection device and the second magnetic body inspection device, which are different devices, are used in remote places, the effects of individual differences of the first magnetic body inspection device and the second magnetic body inspection device in the detection signal can be suppressed, and therefore the respective detection signals can be handled collectively.

In this case, preferably, the magnetic field application unit is configured to apply a magnetic field to the magnetic body so that the magnetization direction of the magnetic body is aligned with each other at the time of inspecting the magnetic body at a shipping location and at the time of inspecting the magnetic body at the location of use. With this configuration, it becomes possible to align the magnetization direction of the magnetic body at the time of inspecting at the shipping location of the magnetic body and at the time of inspecting at the location of use of the magnetic body. Therefore, it is possible to suppress the occurrence of the difference other than the change in the detection signal due to the difference of the magnetization direction, so it is possible to further improve the reproducibility of the measurement data. As a consequence, it becomes possible to further improve the reproducibility of the measurement data, so that the quality of the measurement data for estimating the deterioration state of the magnetic body can be further improved.

In the magnetic body management system according to the first aspect of the present invention, preferably, the second magnetic body inspection device is configured to acquire the detection signal immediately after the magnetic body has been installed at the location of use, and the server is configured to estimate the deterioration state of the magnetic body, based on the first magnetic body information and the second magnetic body information in which the detection signal acquired immediately after the magnetic body has been installed at the location of use and the identifier of the magnetic body are linked. Here, in order to estimate the deterioration state of the magnetic body based on the detection signal before the magnetic body is installed at a location of use and the detection signal after the magnetic body has been actually arranged at the location of use, the respective detection signals must be aligned based on the measured length. Further, there is a case in which the moving speed of the magnetic body when acquiring the detection signal before the magnetic body is installed at the location of use after the start of use differs from the moving speed of the magnetic body when acquiring the detection signal at the location of use. When the moving speed of the magnetic body differs, the interval (sampling pitch) between measuring points of the detection signals of the magnetic body changes. Further, for example, in a case where the magnetic body is used for an elevator, etc., a load is applied to a magnetic body, which may result in a partial elongation. Even in a case where a partial elongation has occurred in the magnetic body, the interval (sampling pitch) of the measuring points of the measurement signals of the magnetic body changes. Therefore, in order to estimate the deterioration state of the magnetic body accurately, it is preferable to perform a correction for aligning the detection signals based on the measured length or correct the difference in the sampling pitch due to the difference in the moving speed or the partial elongation of the magnetic body.

Therefore, with the above-described configuration, since the detection signal is acquired immediately after the start of use at the location where the magnetic body is actually used, it is possible to perform the alignment of the detection signals base on the measured length and/or the correction of the sampling pitch suitable for the actual use environment in the magnetic field information at the time of the production (before the installation at the location of use) and the magnetic field information immediately after the start of use. As a result, the estimation accuracy of the deterioration state of the magnetic body in the server can be improved. Further, since the detection signal is acquired immediately after the start of use, the number of acquiring the detection signal until the periodic inspection is performed can be increased, as compared with the configuration in which a detection signal is not acquired immediately after the start of use, and a detection signal is acquired before the magnetic body is installed at a location of use and after the magnetic body has been installed at the location of use. As a result, the timing at which the deterioration state of the magnetic body has changed can be grasped in more detail. Further, since the detection signal is acquired immediately after the start of use, for example, when used for an elevator, by comparing with the deterioration state of the magnetic body before the start of use, it is possible to predict, for example, breakage of the magnetic body due to the partial elongation of the magnetic body that occurs, for example, when the elevator moves frequently between certain floors.

In the magnetic body management system according to the first aspect of the present invention, preferably, the magnetic body is a wire rope. With this configuration, it is possible to provide a magnetic body management system capable of suppressing the deterioration of the accuracy of the status determination of the wire rope.

In this case, preferably, the identifier of the magnetic body includes an identifier for identifying a portion cut out to a predetermined length at the time of producing the wire rope. With this configuration, it is possible to easily grasp at which position of the wire rope before being cut out into the predetermined length the wire rope cut into the predetermined length was positioned. Therefore, even in the case of using the wire rope by cutting out the wire rope into the predetermined length after the production, it is possible to easily acquire the magnetic body information in the cut-out wire rope. As a result, the change of the deterioration state of the wire rope can be easily grasped by acquiring the detection signal after the start of use of the wire rope cut out into a predetermined length.

A magnetic body management method according to a second aspect of the present invention, includes: a step of acquiring, at a shipping location of a magnetic body, a first detection signal based on a magnetic field of the magnetic body or a change in the magnetic field; a step of acquiring, at a location of use of the magnetic body, a second detection signal of the magnetic body by the same method as a method for acquiring the first detection signal; a step of storing first magnetic body information in which the first detection signal and an identifier of the magnetic body are linked in a server; a step of storing second magnetic body information in which the second detection signal and the identifier of the magnetic body are linked in the server; and a step of estimating a deterioration state of the magnetic body based on at least the first magnetic body information and the second magnetic body information.

In the magnetic body management method according to the second aspect of the present invention, as described above, the method includes: a step of acquiring, at a shipping location of a magnetic body, a first detection signal; a step of acquiring, at a location of use of the magnetic body, a second detection signal of the magnetic body by the same method as a method for acquiring the first detection signal; a step of storing first magnetic body information in a server; a step of storing second magnetic body information in the server; and a step of estimating a deterioration state of the magnetic body based on at least the first magnetic body information and the second magnetic body information. With this, similarly to the magnetic body management system according to the first aspect of the present invention, it is possible to suppress the deterioration of the quality of the measurement data to be accumulated, and it is also possible to provide a magnetic body management method capable of suppressing the deterioration of the accuracy of the status determination of the magnetic body.

Effects of the Invention

According to the present invention, as described above, it is possible to provide a magnetic body management system and a magnetic body management method capable of suppressing the deterioration of the quality of measurement data to be accumulated and also capable of suppressing the deterioration of the accuracy of the condition determination of a magnetic body.

BRIEF DESCRIPTION OF THE DRAWINGS

FIG. 1 is a schematic diagram showing an entire configuration of a magnetic body management system according to a first embodiment.

FIG. 2 shows a schematic diagram (A) showing an arrangement example of a first magnetic body inspection device at a shipping location and a schematic diagram (B) showing an arrangement example of a second magnetic body inspection device at a location of use.

FIG. 8 shows a schematic diagram (A) of a first detection signal, a schematic diagram (B) of a second detection signal, and a schematic diagram (C) of a differential waveform when there is no change in a deterioration state of a magnetic body.

FIG. 10 shows a schematic diagram (A) showing an example of first magnetic body information, a schematic diagram (B) showing an example of second magnetic body information, and a schematic diagram (C) showing an example of magnetic body deterioration information.

FIG. 15 shows a schematic diagram (A) to a schematic diagram (C) for explaining a magnetic field application unit according to a first modification.

FIG. 16 shows a schematic diagram (A) to a schematic diagram (F) for explaining a detection unit according to a second modification.

EMBODIMENTS FOR CARRYING OUT THE INVENTION

Figure 3:
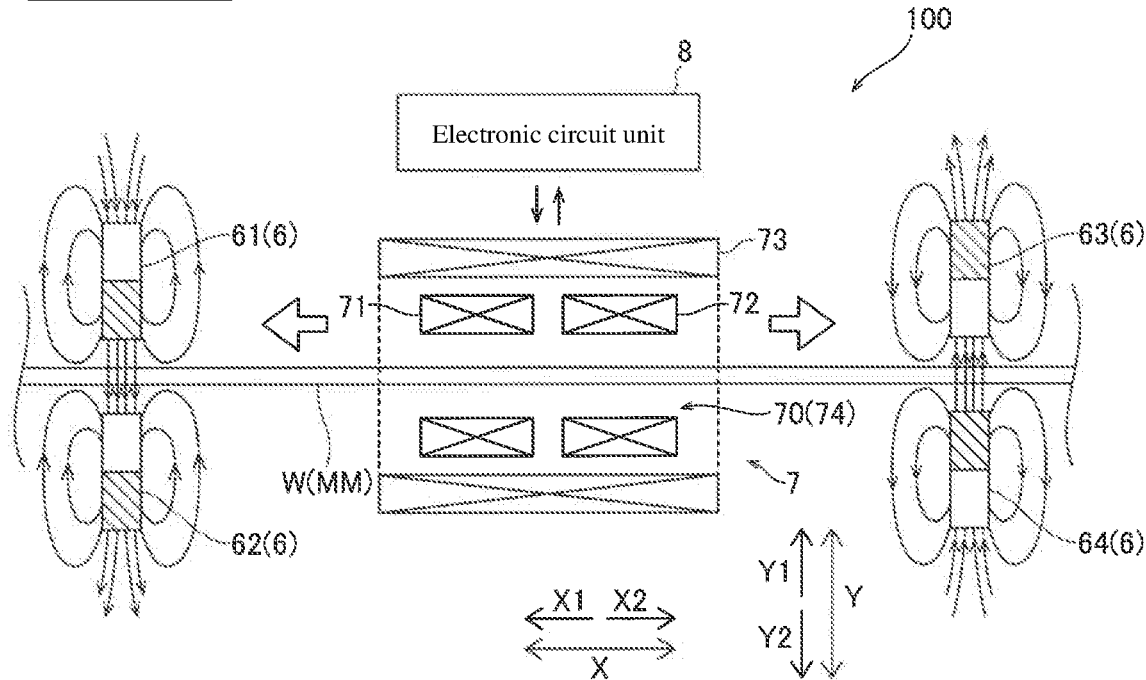
FIG. 3 is a diagram for explaining configurations of a detection unit and a magnetic field application unit of the first magnetic body inspection device and the second magnetic body inspection device according to the first embodiment.

Hereinafter, embodiments in which the present invention is embodied will be described with reference to the attached drawings.

First Embodiment

Referring to FIG. 1 to FIG. 4, the configuration of a magnetic body management system 100 according to a first embodiment of the present invention will be described. (Configuration of Magnetic Body Management System)

First, referring to FIG. 1, the configuration of the magnetic body management system 100 according to the first embodiment will be described.

As shown in FIG. 1, the magnetic body management system 100 is provided with a first magnetic body inspection device 1, a second magnetic body inspection device 2, a server 3, a first transmission unit 4, and a second transmission unit 5.

The first magnetic body inspection device 1 is configured to acquire a detection signal DS (first detection signal DS1) (see FIG. 5) based on a magnetic field of a magnetic body MM or the change in the magnetic field at the shipping location of the magnetic body MM. The detailed configuration that the first magnetic body inspection device 1 acquires the detection signal DS will be described later. Note that in this embodiment, the shipping location includes a production plant where the magnetic body MM is produced, a storage warehouse where the magnetic body MM is stored after the production, and the like. Further note that the magnetic body MM to be inspected by the first magnetic body inspection device 1 is a wire rope W. Note that the wire rope W is an example of the "magnetic body" recited in claims.

The second magnetic body inspection device 2 is configured to acquire a detection signal DS (second detection signal DS2 (see FIG. 6)) by the same method as that of the first magnetic body inspection device 1 that acquires a detection signal DS of the wire rope W, at the location of use of the wire rope W. The detailed configuration that the second magnetic body inspection device 2 acquires the detection signal DS will be described later. Note that in this embodiment, the term "location of use" refers to a location where the wire rope W has been installed (machine, equipment, infrastructure, etc.).

The first transmission unit 4 is configured to transmit the first magnetic body information 10 (see (A) of FIG. 10) in which the detection signal DS acquired by the first magnetic body inspection device 1 and the ID of the wire rope W are linked to a server 3. In the first embodiment, the first transmission unit 4 is included in the first magnetic body inspection device 1 and is configured to transmit the first magnetic body information 10 to the server 3 via the network N. In the first embodiment, the first transmission unit 4 includes, for example, a transmitter and is configured to be wirelessly connected to the network N. The ID is a unique number, symbol, or combination thereof assigned to each wire rope W. Linking the detection signal DS and the ID of the wire rope W means that the wire rope W and the ID are associated with each other in a one-to-one relationship by assigning one ID to one wire rope W. Further note that the ID is an example of the "identifier" recited in claims.

Further note that the ID of the wire rope W includes a branch number ID for discriminating a portion cut out to a predetermined length at the time of producing the wire rope W. Note that the branch number ID is an example of the "identifier for identifying a portion cut out" recited in claims.

The second transmission unit 5 is configured to transmit the second magnetic body information 11 (see FIG. 10 (B)) in which the detection signal DS acquired by the second magnetic body inspection device 2 and the ID of the wire rope W are linked to the server 3. In the first embodiment, the second transmission unit 5 is included in the second magnetic body inspection device 2 and is configured to transmit the second magnetic body information 11 to the server 3 via the network N. In the first embodiment, the second transmission unit 5 includes, for example, a transmitter and is configured to be wirelessly connected to the network N.

The server 3 includes a control unit 30, a storage unit 31, a deterioration information transmission unit 32, and a magnetic body information acquisition unit 33. The server 3 is connected to the network N. The first magnetic body inspection device 1 and the second magnetic body inspection device 2 are also connected to the network N. Therefore, the server 3, the first magnetic body inspection device 1, and the second magnetic body inspection device 2 are configured to transmit and receive information via the network N.

The control unit 30 is configured to estimate the deterioration state of the wire rope W based on the first magnetic body information 10 and the second magnetic body information 11. Further, the control unit 30 is configured to store the magnetic body information (the first magnetic body information 10 and the second magnetic body information 11) transmitted to the server 3 in the storage unit 31. The control unit 30 includes, for example, a CPU (Central Processing Unit), a ROM (Read Only Memory), and a RAM (Random Access Memory). The details of the processing of estimating the deterioration state of the wire rope W by the control unit 30 will be described later.

The storage unit 31 stores programs to be executed by the control unit 30. The storage unit 31 includes a specific information storage unit 31a, a deterioration information storage unit 31b, and an abnormality information storage unit 31c. The specific information storage unit 31a is configured to store the first magnetic body information 10 as the specific information of the wire rope W. Further, the deterioration information storage unit 31b is configured to store the second magnetic body information 11 as the deterioration information of the wire rope W. The deterioration information storage unit 31b is configured to store the magnetic body deterioration information 12 (see FIG. 10) to be described later. Further, the abnormality information storage unit 31c is configured to store the abnormality information 13 (see FIG. 9) to be described later. The storage unit 31 includes, for example, a nonvolatile memory, an HDD (Hard Disk Drive), an SSD (Solid State Drive), and the like. The specific information storage unit 31a, the deterioration information storage unit 31b, and the abnormality information storage unit 31c include database of the specific information constructed in the storage unit 31, database of the deterioration information, and database of the abnormality information 13, respectively.

The deterioration information transmission unit 32 is configured to transmit the deterioration information (the magnetic body deterioration information 12) of the wire rope W including at least the differential waveform DW (see FIG. 9) in response to a request from at least one of the first magnetic body inspection device 1 and the second magnetic body inspection device 2. The deterioration information transmission unit 32 includes, for example, an I/O interface.

The magnetic body information acquisition unit 33 is configured to acquire the first magnetic body information 10 and the second magnetic body information 11 transmitted from the first magnetic body inspection device 1 and the second magnetic body inspection device 2, respectively, via the network N. The magnetic body information acquisition unit 33 includes, for example, an input/output interface.

(Shipping Location and Location of Use)

Next, referring to FIG. 2, an example of a shipping location where the first magnetic body inspection device 1 is arranged and an example of a location of use where the second magnetic body inspection device 2 is arranged will be described. Note that in the first embodiment, the shipping location and the location of use are different locations.

In the example shown in (A) of FIG. 2, the first magnetic body inspection device 1 is arranged in a production plant of the wire rope W as a shipping location of the wire rope W. Specifically, the first magnetic body inspection device 1 is arranged in the production plant in order to inspect the wire rope W at the time of producing the wire rope W which is formed by twisting a plurality of members such as strands WS. Note that the members such as strands WS denotes a core, a wire, and a strand which is made by twisting wires.

As shown in (A) of FIG. 2, the first magnetic body inspection device 1 is arranged between a twisting mechanism M1 for twisting a plurality of members such as strands WS and a winding drum M2 for winding a wire rope W and acquires a detection signal DS of the wire rope W before being wound by the winding drum M2. That is, the first magnetic body inspection device 1 acquires a detection signal DS of the wire rope W in a pre-use (unused) state. Note that the wire rope W is cut out to a predetermined length and is transported to a location of use in a state in which it is cut and wound on a winding drum that differs from the winding drum M2.

In the example shown in (B) of FIG. 2, the second magnetic body inspection device 2 is arranged in an elevator E as a location of use of the wire rope W. Specifically, the second magnetic body inspection device 2 is arranged in an elevator E to inspect the wire rope W installed on the elevator E. The elevator E includes a cage E1, a hoisting machine E2 for raising and lowering the cage E1 by winding the wire rope W, and a position sensor E3 for detecting the position of the cage E1 (wire rope W). In the elevator E, since the wire rope W is moved by the hoisting machine E2, the inspection is performed as the wire rope W moves in a state in which the second magnetic body inspection device 2 is fixed. In the example shown in (B) of FIG. 2, the second magnetic body inspection device 2 inspects the wire rope W while relatively moving along the surface of the wire rope W in the direction (X-direction) along which the wire rope W extends. That is, the second magnetic body inspection device 2 acquires the detection signal DS of the wire rope W in a state in which it has been installed in the elevator E (while using it). Further, the second magnetic body inspection device 2 is configured to acquire a detection signal DS immediately after it has been installed at the location of use (elevator E).

In the first embodiment, the magnetic body management system 100 acquires the deterioration state of one wire rope W transported from the shipping location to the location of use and installed in an elevator E over time.

(Configuration of Wire Rope)

The wire rope W is a magnetic body MM formed of an elongated member extending in the X-direction. As shown in (A) of FIG. 2, the wire rope W is formed by twisting members such as strands WS having magnetism. The wire rope W is monitored for the deterioration state (presence or absence of damage, etc.) to prevent the breakage, etc., due to the deterioration or the like. Then, the wire rope W in which the deterioration state progresses beyond a predetermined state and the risk of breakage or the like is increased will be replaced prior to the occurrence of breakage or the like.

(Configurations of First Magnetic Body Inspection Device and Second Magnetic Body Inspection Device)

Next, referring to FIG. 3 and FIG. 4, the configurations of the first magnetic body inspection device 1 and the second magnetic body inspection device 2 will be described.

Figure 4:
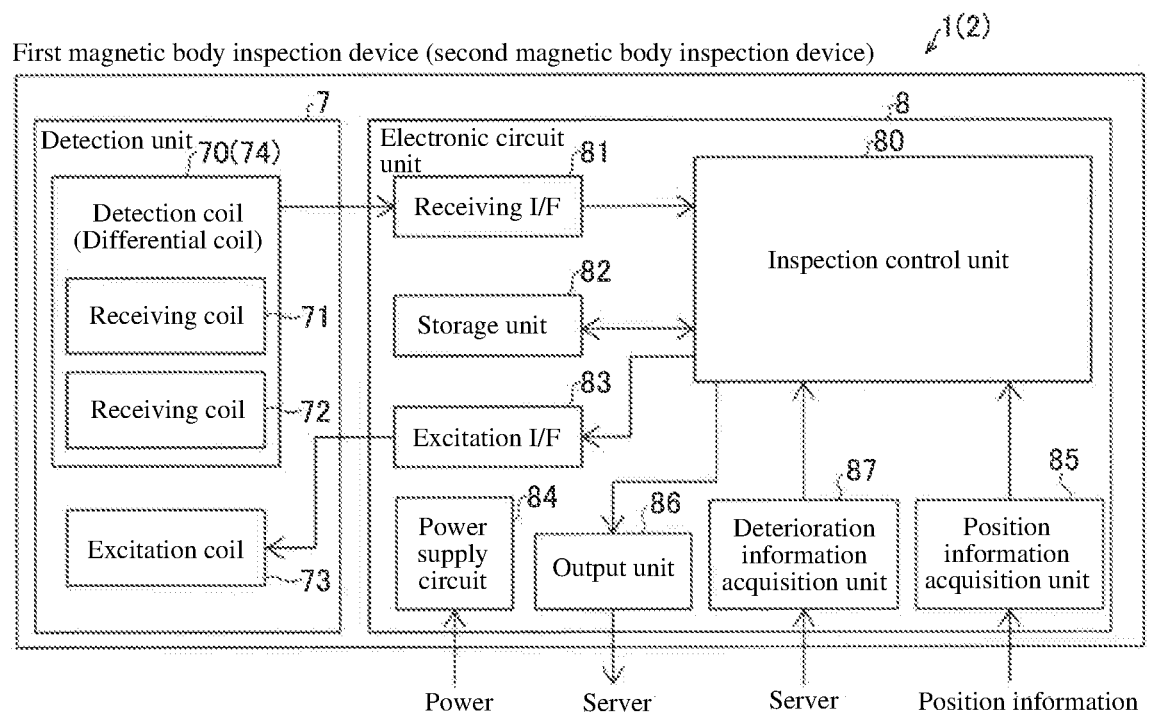
FIG. 4 is a block diagram showing a control structure of the first magnetic body inspection device and the second magnetic body inspection device according to the first embodiment.

The first magnetic body inspection device 1 and the second magnetic body inspection device 2 are each provided with a magnetic field application unit 6, a detection unit 7, an output unit 86 (see FIG. 4), and a deterioration information acquisition unit 87 (see FIG. 4). In the first embodiment, as shown in FIG. 3, the first magnetic body inspection device 1 and the second magnetic body inspection device 2 are each configured to detect a change in the magnetic field (total magnetic flux) of the wire rope W by the detection coil 70.

(Configuration of Magnetic Field Application Unit)

As shown in FIG. 3, the magnetic field application unit 6 is configured to align the magnetization direction of the wire rope W by applying a magnetic field to the wire rope W in a predetermined direction prior to performing the detection of the detection signal DS by the detection unit 7. The magnetic field application unit 6 includes a first magnetic field application unit including magnets 61 and 62 and a second magnetic field application unit including magnets 63 and 64. The magnets 61, 62, 63 and 64 are each configured by, for example, a permanent magnet.

The first magnetic field application unit (magnets 61 and 62) is arranged on one side (X1-direction side) of the extending direction of the wire rope W with respect to the detection unit 7. Further, the second magnetic field application unit (magnets 63 and 64) are arranged on the other side (X2-direction side) of the extending direction of the wire rope W with respect to the detection unit 7. In the example shown in FIG. 3, the magnets 61 and 62 are arranged so that different poles of the S and N poles are opposed to each other. Also for the magnets 63 and 64, different poles of the S pole and N pole are opposed to each other. Note that in the example shown in FIG. 3, for convenience, in the magnet 61 (62, 63 and 64), it is illustrated with hatching on one pole.

Further, the magnetic field application unit 6 is configured to apply a magnetic field to the wire rope W so that the magnetization direction of the wire rope W is aligned with each other at the time of inspecting the wire rope W at the shipping location and at the time of inspecting the wire rope W at the location of use. Specifically, the magnetic field application units 6 provided in the first magnetic body inspection device 1 and the second magnetic body inspection device 2 are configured to apply a magnetic field in the same direction with respect to the wire rope W. Therefore, the magnetic field application units 6 provided in the first magnetic body inspection device 1 and the second magnetic body inspection device 2 can align the magnetization direction of the wire rope W to each other at the time of inspecting the wire rope W at the shipping location and at the time of inspecting the wire rope W at the location of use.

(Configuration of Detection Unit)

The detection unit 7 includes a detection coil 70 for detecting the change in the total magnetic flux of the wire rope W and is configured to output a detection signal DS of the wire rope W in which the magnetization direction is aligned by the magnetic field application unit 6. The detection coil 70 includes a pair of differential coils 74 having receiving coils 71 and 72 and acquiring the difference value of the detection signals DS received by the receiving coils 71 and 72. The detection coil 70 (differential coil 74) and the excitation coil 73 are, as shown in FIG. 3, wound a plurality of times along the extending direction of the wire rope W (X-direction) about the central axis in the extending direction of the wire rope W. Therefore, the surfaces forming the wound conductive portion of the detection coil 70 and the excitation coil 73 are substantially perpendicular to the extending direction of the wire rope W (X-direction). The wire rope W passes through the inside of the detection coil 70 and the excitation coil 73. Further, the detection coil 70 is provided inside the excitation coil 73 in the Y-direction. The receiving coils 71 and 72 are provided inside the detection unit 7, and the receiving coil 71 of the receiving coils 71 and 72 is arranged on the X1-direction side. Further, the receiving coil 72 of the receiving coils 71 and 72 is arranged on the X2-direction side. Note that the detection coil 70 is configured to detect the detection signal DS in a non-contact state with respect to the wire rope W.

The detection coil 70 is configured to detect a change in the magnetic field of the wire rope W which is an inspection target in the X-direction by a pair of receiving coils 71 and 72. That is, the detection coil 70 detects the change in the total magnetic flux in the X-direction with respect to the wire rope W to which a magnetic field is applied by the excitation coil 73. Further, the detection coil 70 is configured to output the change in the magnetic field of the detected wire rope W in the X-direction. The detection coil 70 is configured to acquire the change in the magnetic field of the wire rope W as a voltage value and output it.

The excitation coil 73 excites the magnetization state of the wire rope W. Specifically, the excitation coil 73 generates an AC magnetic field by following an AC current through the excitation coil 73. The excitation coil 73 is configured to excite the magnetization state of the wire rope W in the interior of the excitation coil 73 by applying an AC magnetic field generated based on the exciting AC current to the wire rope W.

In a case where there is damage (breakage, etc.) in the wire rope W, the total magnetic flux (value obtained by multiplying the magnetic field by the magnetic permeability and the area) becomes smaller as compared with the portion where the wire rope has no damage (breakage, etc.). Consequently, for example, when the receiving coil 71 is positioned at the location where there is damage (breakage, etc.), the magnetic flux amount passing through the detection coil 70 changes as compared with the receiving coil 72. Therefore, the absolute value of the difference between the detected voltages by the detection coil 70 (the difference value of the detection signal DS) increases. On the other hand, the detection signal DS at a portion where there is no damage (breakage, etc.) is almost zero. Thus, in the detection coil 70, a clear signal (signal with a good SN ratio) indicating the presence of damage (breakage, etc.) is detected. This allows the electronic circuit unit 8 to detect the presence of damage (breakage, etc.) of the wire rope W based on the value of the detection signal DS.

Note that in the first embodiment, it is configured such that at the shipping location and at the location of use, the wire rope W moves with respect to the first magnetic body inspection device 1 and the second magnetic body inspection device 2. Therefore, it is possible to acquire the detection signal DS of the wire rope W without moving the first magnetic body inspection device 1 and the second magnetic body inspection device 2. Note that, for example, in a case where the wire rope W does not move, by moving the first magnetic body inspection device 1 and the second magnetic body inspection device 2, the first magnetic body inspection device 1 and the second magnetic body inspection device 2 can acquire a detection signal DS of the wire rope W.

(Configuration of Magnetic Body Inspection Unit)

As shown in FIG. 4, the first magnetic body inspection device 1 and the second magnetic body inspection device 2 is each provided with a detection unit 7 and an electronic circuit unit 8. The detection unit 7 includes a detection coil 70 and an excitation coil 73. The electronic circuit unit 8 includes an inspection control unit 80, a receiving I/F 81, a storage unit 82, an excitation I/F 83, a power supply circuit 84, a position information acquisition unit 85, an output unit 86, and a deterioration information acquisition unit 87.

The inspection control unit 80 of the electronic circuit unit 8 shown in FIG. 4 is configured to control each part of the first magnetic body inspection device 1 and the second magnetic body inspection device 2. Specifically, the inspection control unit 80 includes processors, such as, e.g., a CPU, a memory and an AD converter.

The inspection control unit 80 is configured to acquire a detection signal DS based on the total magnetic flux detected by the detection coil 70. Further, the inspection control unit 80 is configured to receive the detection signal DS detected by each of the pair of differential coil 74 (receiving coils 71 and 72) and output it to the server 3 via the output unit 86. Further, the inspection control unit 80 is configured to perform control to excite the excitation coil 73.

Further, the inspection control unit 80 is configured to acquire the position information of the detection unit 7 (detection coil 70) in the wire rope W via the position information acquisition unit 85. The inspection control unit 80 is configured to acquire, for example, the position information of the detection unit 7 from the position sensor E3 of the elevator E.

The storage unit 82 is configured to store the detection information in which the position information at the time of detecting the detection signal DS of the wire rope W and the detection signal DS of the wire rope W detected by the position information detection coil 70 (differential coil 74) by the inspection control unit 80 are linked. The storage unit 82 may be composed of, for example, a flash memory, an HDD, or an SSD. The inspection control unit 80 is configured to transmit the detection information to the server 3 via the output unit 86.

The receiving I/F 81 is configured to receive a signal (voltage value) based on the total magnetic flux from the detection coil 70 and transmit it to the inspection control unit 80, under the control of the inspection control unit 80. Specifically, the receiving I/F 81 includes an amplifier. The receiving I/F 81 is configured to amplify the signal based on the total magnetic flux of the detection coil 70 and transmits it to the inspection control unit 80.

The excitation I/F 83 is configured to control the supply of power to the excitation coil 73 under the control of the inspection control unit 80. Specifically, the excitation I/F 83 controls the supply of power from the power supply circuit 84 to the excitation coil 73 based on the control signal from the inspection control unit 80.

The position information acquisition unit 85 is configured to acquire the position information of the detection unit 7 at the time of detecting the detection signal DS of the wire rope W under the control of the inspection control unit 80. The position information acquisition unit 85 is configured to acquire the position information of the detection unit 7 acquired by the position sensor E3 of the elevator E. The position information acquisition unit 85 includes, for example, a serial communication port. Here, in order to estimate the deterioration state of the wire rope W based on the detection signal DS before the wire rope W is installed at the location of use and the detection signal DS after the wire rope W has been actually arranged at the location of use, the respective detection signals DS must be aligned based on the measured length. Further, in some cases, the moving speed of the wire rope W at the time of acquiring the detection signal DS before the wire rope W is installed at the location of use may differ from the moving speed of the wire rope W at the time of acquiring the detection signal DS at the location of use. When the moving speed of the wire rope W differs, the intervals (sampling pitches) of the measuring points of the detection signals DS of the wire rope W change. Further, for example, in a case where the wire rope W is used for an elevator E, a load is applied to the wire rope W. Therefore, there is a case in which the partial elongation occurs in the wire rope W. Even in a case where the wire rope W is partially elongated, the intervals (sampling pitches) of the measured points of the detection signals DS of the wire rope W change. Therefore, in order to accurately estimate the deterioration state of the wire rope W, it is preferable to perform a correction for aligning the detection signals DS based on the measured length and correct the difference of the sampling pitches due to the partial elongation of the wire rope W. Even in a case where there is a difference in the moving speed of the wire rope W in different circumstances, or even in a case where the wire rope W is loaded and partially elongated, since the position information acquisition unit 85 is provided, it is possible to align the inspection data based on the measured length.

The output unit 86 is configured to output the detection signal DS detected by the detection unit 7 to the server 3 via the network N. The output unit 86 includes, for example, an I/O interface.

The deterioration information acquisition unit 87 is configured to acquire the information of the deterioration state of the wire rope W from the server 3 via the network N. The deterioration information acquisition unit 87 includes, for example, an I/O interface.

(Detection Signal and Differential Waveform)

Next, referring to FIG. 5 to FIG. 7, the first detection signal DS1, the second detection signal DS2, and the differential waveform DW will be described.

Figure 5:
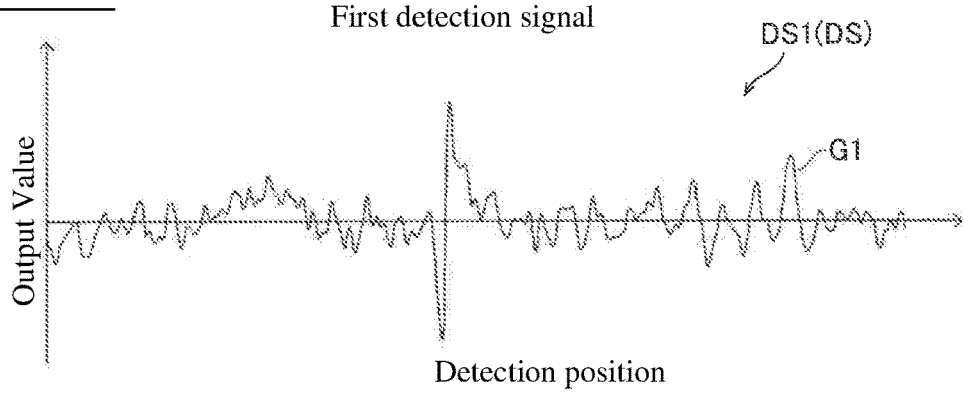
FIG. 5 is a schematic diagram showing a waveform of a first detection signal.

FIG. 5 shows a schematic diagram of a graph G1 of a first detection signal DS1 acquired by the first magnetic body inspection device 1. In the graph G1, the horizontal axis represents the position information of the first magnetic body inspection device 1 (detection coil 70). Further, in the graph G1, the vertical axis represents the signal intensity of the detection signal DS (first detection signal DS1).

Figure 6:
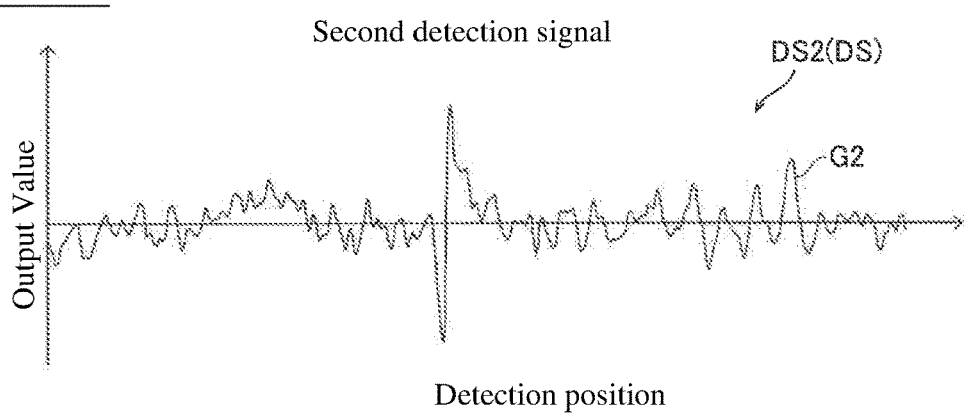
FIG. 6 is a schematic diagram showing a waveform of a second detection signal.

FIG. 6 shows a schematic diagram of a graph G2 of the second detection signal DS2 acquired by the second magnetic body inspection device 2. In the graph G2, the horizontal axis represents the position information of the second magnetic body inspection device 2 (detection coil 70). In the graph G2, the vertical axis represents the signal intensity of the detection signal DS (second detection signal DS2).

As shown in FIG. 5 and FIG. 6, the detection signal DS (the first detection signal DS1 and the second detection signal DS2) is information including the position information of the detection unit 7 when the detection signal DS is detected and the signal intensity of the detection signal DS.

Figure 7:
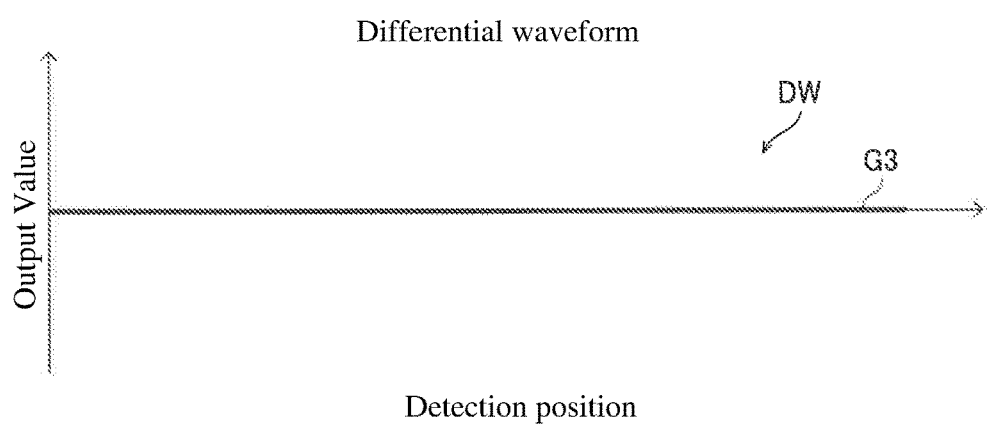
FIG. 7 is a schematic diagram showing a differential waveform.

In the first embodiment, the server 3 acquires the differential waveform DW such as the graph G3 shown in FIG. 7, based on the first detection signal DS1 and the second detection signal DS2. Specifically, the server 3 acquires the differential waveform DW by acquiring the difference between the first detection signal DS1 and the second detection signal DS2. In the example shown in FIG. 7, since the value of the graph G3 is almost zero, the thickness of the line of the graph G3 is shown at the same position as the horizontal axis of the graph G3 by changing the thickness of the horizontal axis of the graph G3. Further, the first magnetic body inspection device 1 and the second magnetic body inspection device 2 are configured to perform sensitivity calibration, respectively. Specifically, it is configured such that the correction is performed so that the vertical axis of the graph G1 coincides with the vertical axis of the graph G2.

(Estimation of Deterioration State)

Next, referring to FIG. 8 and FIG. 9, the configuration in which the control unit 30 according to the first embodiment estimates the deterioration state of the wire rope W will be described.

The example shown in (A) and (B) of FIG. 8 is an example in which the deterioration state of the wire rope W has not been changed between the inspection time by the first magnetic body inspection device 1 and the inspection time by the second magnetic body inspection device 2.

The first magnetic body inspection device 1 and the second magnetic body inspection device 2 each have the magnetic field application unit 6, so that it is possible to suppress the noise generated in the detection signal DS. Therefore, the detection signals DS acquired by the first magnetic body inspection device 1 and the second magnetic body inspection device 2 are highly reproducible. Note that the detection signal DS is high reproducible means that the degree of coincidence of the shapes of the detection signals DS to be acquired when the wire rope W is inspected by the first magnetic body inspection device 1 and the second magnetic body inspection device 2 is high.

The first magnetic body inspection device 1 and the second magnetic body inspection device 2 are provided with, as described above, the magnetic field application unit 6, the excitation coil 73, and the differential coil 74 and is configured to acquire the detection signal DS of the wire rope W by a total magnetic flux method. Therefore, since the reproducibility of the detection signals DS acquired by the first magnetic body inspection device 1 and the second magnetic body inspection device 2 is higher than that of a conventional device, the first detection signal DS1 and the second detection signal DS2 have substantially the same waveform unless the deterioration state of the wire rope W has changed between the time of the inspection by the first magnetic body inspection device 1 and the time of the inspection by the second magnetic body inspection device 2.

Therefore, in a case where the deterioration state of the wire rope W has not changed, the differential waveform DW acquired by the server 3 acquiring the difference between the first detection signal DS1 and the second detection signal DS2 becomes a linear graph having a substantially constant value, as shown in the graph G3 of (C) of FIG. 8.

Figure 9:
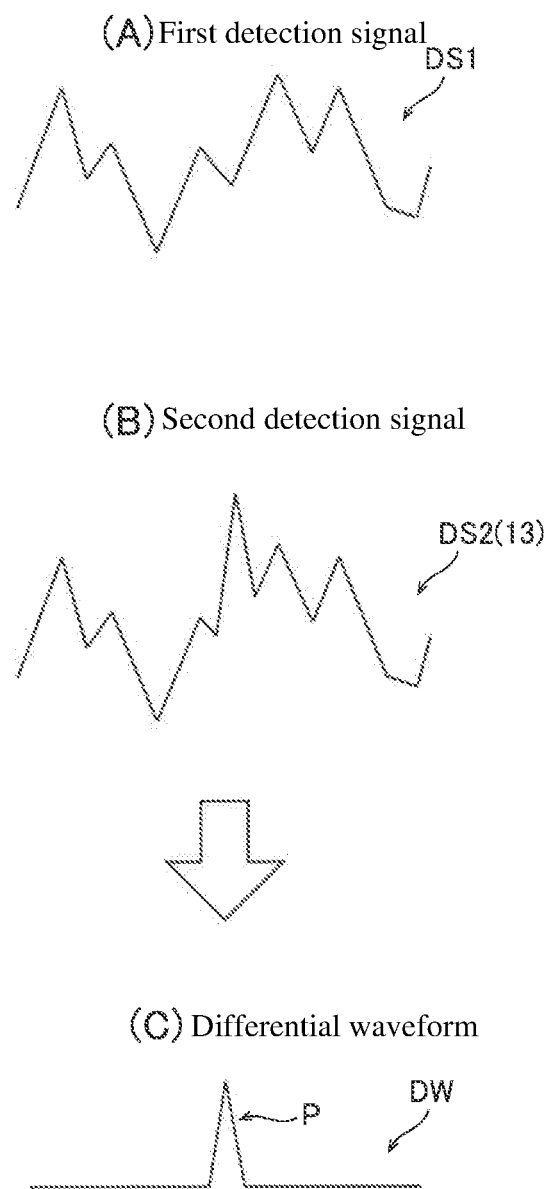
FIG. 9 shows a schematic diagram (A) of a first detection signal, a schematic diagram (B) of a second detection signal (B), and a schematic diagram (C) of a differential waveform when there is a change in a deterioration state of a magnetic body.

(A) of FIG. 9 is a schematic diagram of a detection signal DS (first detection signal DS1) at the time of the inspection by the first magnetic body inspection device 1. (B) of FIG. 9 is a schematic diagram of a detection signal DS (second detection signal DS2) at the time of the inspection by the second magnetic body inspection device 2. The example shown in (A) and (B) of FIG. 9 is an example in which the deterioration state of the wire rope W has changed between the time of the inspection by the first magnetic body inspection device 1 and the time of the inspection by the second magnetic body inspection device 2.

As shown in (A) and (B) of FIG. 9, since the deterioration state of the wire rope W has changed at the time of the inspection by the first magnetic body inspection device 1 and at the time of the inspection by the second magnetic body inspection device 2, the shapes of the first detection signal DS1 and the second detection signal DS2 do not coincide with each other. Therefore, the differential waveform DW acquired based on the difference between the first detection signal DS1 and the second detection signal DS2 becomes a waveform having a peak P caused by the deterioration of the wire rope W, as shown in (C) of FIG. 9.

The server 3 can acquire the change in the deterioration state of the wire rope W based on the change in the change in the magnitude (intensity) of the peak P caused in the differential waveform DW. Further, the server 3 can determine whether or not damage has occurred in the wire rope W based on the magnitude (intensity) of the peak P caused in the differential waveform DW. For example, the server 3 can determine that damage has occurred in the wire rope W when the magnitude (intensity) of the peak P caused in the differential waveform DW has exceeded a predetermined threshold. Further, the server 3 is configured to estimate the deterioration state of the wire rope W based on the first magnetic body information 10, the detection signal DS acquired immediately after being installed at the location of use (elevator E), and the second magnetic body information 11 linked to the ID of the wire rope W.

Further, the server 3 can determine the type of the damage generated in the wire rope W based on the shape of the waveform of the second detection signal DS2. Specifically, since the shape of the waveform of the detection signal DS differs depending on the damage generated in the wire rope W, the server 3 can determine the type of the damage generated in the wire rope W depending on the shape of the waveform of the detection signal DS. The server 3 can determine, for example, breakage, kinks, and disordered twists of the wire rope W. Note that the kinks of the wire rope W denote a state in which unrecoverable plastic deformation, such as, e.g., twists and bunched curves, has occurred due to a handling failure when pulling out the wire rope W from the winding drum M2, extending the wire rope W, or the like. Further, the disordered twists of the wire rope W denote a state in which the twisted state of the wire rope W differs from a normal part of the wire rope W due to, for example, unintentional cross twisting of some of members such as strands WS occurred when twisting members such as strands WS.

As the method of determining the damage type of the wire rope W by the server 3 based on the shape of the waveform of the second detection signal DS2, there are, for example, machine learning and fitting of the shape to the model waveform of damage of a wire rope W.

Since the first magnetic body inspection device 1 and the second magnetic body inspection device 2 acquire detection signals DS in the same method, the reproducibility of the detection signal DS is increased, so it is possible to accurately detect peaks P, such as, e.g., the breakage of the wire rope W. Therefore, the server 3 can accurately detect the damage of the wire rope W, the type of damage, and the like.

(Information Exchange Between Magnetic Body Inspection Device and Server)

Next, referring to FIG. 10 and FIG. 11, the information transmitted and received between the first magnetic body inspection device 1 and the second magnetic body inspection device 2, and the server 3 will be described.

(A) of FIG. 10 shows an example of first magnetic body information 10 transmitted from the first magnetic body inspection device 1 to the server 3.

The first magnetic body inspection device 1 is configured to transmit the first magnetic body information 10 to the server 3. The first magnetic body information 10 includes the ID of the wire rope W, the product information of the wire rope W, the date and time when the first detection signal DS1 was acquired, and the first detection signal DS1. The product information of the wire rope W includes, for example, the length of the wire rope W and the diameter of the wire rope W.

(B) of FIG. 10 shows an example of second magnetic body information 11 transmitted from the second magnetic body inspection device 2 to the server 3.

The second magnetic body inspection device 2 is configured to transmit the second magnetic body information 11 to the server 3. The second magnetic body information 11 includes the ID of the wire rope W, the date and time when the second detection signal DS2 was acquired, and the second detection signal DS2.

As shown in (A) and (B) of FIG. 10, the first magnetic body information 10 differs from the second magnetic body information 11 in the information included therein.

(C) of FIG. 10 is an example of the magnetic body deterioration information 12 transmitted from the server 3 to at least one of the first magnetic body inspection device 1 and the second magnetic body inspection device 2.

The server 3 is configured to transmit magnetic body deterioration information 12 to at least one of the first magnetic body inspection device 1 and the second magnetic body inspection device 2. The magnetic body deterioration information 12 includes the ID of the wire rope W, the acquisition date and time of the detection signal DS when acquiring the differential waveform DW, and the differential waveform DW. Note that in the first embodiment, the server 3 is configured to transmit the magnetic body deterioration information 12 in response to a request from at least one of the first magnetic body inspection device 1 and the second magnetic body inspection device 2.

Further, in the first embodiment, the server 3 is configured to store, as abnormality information 13, the waveform information of the detection signal DS (the second detection signal DS2) in the second magnetic body information 11 when it is estimated that damage (e.g., breakage) has occurred in the wire rope W, when estimating the deterioration state of the wire rope W.

Figure 11:
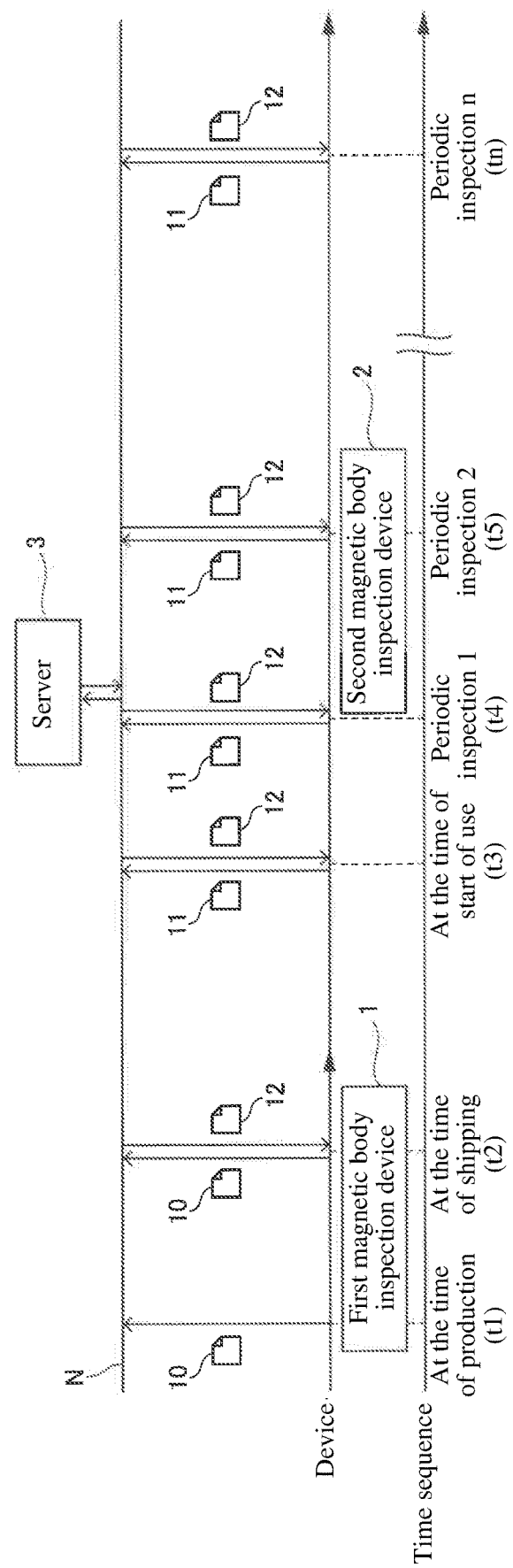
FIG. 11 is a schematic diagram for explaining the exchange of information between a server and magnetic body inspection devices.

FIG. 11 shows an example in which the transmission and reception of information in the first magnetic body inspection device 1 and the second magnetic body inspection device 2, and the server 3 is shown in time sequence.

As shown in FIG. 11, initially, the first magnetic body inspection device 1 transmits the first magnetic body information 10 acquired at the production time (t1) of the wire rope W to the server 3. The server 3 stores the transmitted first magnetic body information 10 in the specific information storage unit 31a. Note that the information to be stored in the specific information storage unit 31a is the initial first magnetic body information 10 transmitted to the server 3. Specifically, the server 3 stores the first detection signal DS1 and the product information of the wire rope W, which are included in the first magnetic body information 10, as specific information. Note that the specific information of the wire rope W denotes the shape of the waveform of the detection signal DS that is peculiar to the individual wire rope W, which does not match the shape of other wire ropes W when the wire rope W is measured by the same method of the inspection device.

Since the detection signal DS (first detection signal DS1) acquired by the first magnetic body inspection device 1 is highly reproducible, the shape of the waveform of the detection signal DS (the first detection signal DS1) of the wire rope W and the specific information of the wire rope W can be handled as fingerprints.

Next, the first magnetic body inspection device 1 transmits the first magnetic body information 10 acquired at the time (t2) of shipping the wire rope W to the server 3. When the first magnetic body information 10 is transmitted at the second time and thereafter, since the specific information of the wire rope W has already been stored in the specific information storage unit 31a, the first magnetic body information 10 may include the ID of the wire rope W, the data acquisition date and time, and the first detection signal DS1, like the second magnetic body information 11. The server 3 stores the transmitted first magnetic body information 10 in the deterioration information storage unit 31b. At this time, when there is a request from the first magnetic body inspection device 1, the server 3 transmits the magnetic body deterioration information 12 at the time (t1) of the production and the time (t2) of the shipment to the first magnetic body inspection device 1. Thereafter, the wire rope W is transported to the location of use.

Next, at the time (t3) of the start of use of the wire rope W, the second magnetic body inspection device 2 transmits the acquired second magnetic body information 11 to the server 3. The server 3 stores the transmitted second magnetic body information 11 in the deterioration information storage unit 31b. At this time, when there is a request from the second magnetic body inspection device 2, the server 3 transmits the magnetic body deterioration information 12 to the second magnetic body inspection device 2 at the time (t2) of the shipment and at the time (t3) of the start of use.

Thereafter, at the time (t4) of the periodic inspection 1, at the time (t5) of the periodic inspection 2, and at the time (tn) of the periodic inspection n for acquiring the information of the deterioration state of the wire rope W, the second magnetic body inspection device 2 transmits the acquired second magnetic body information 11 to the server 3. The server 3 stores the transmitted second magnetic body information 11 in the deterioration information storage unit 31b. Further, the server 3 transmits the magnetic body deterioration information 12 to the second magnetic body inspection device 2 in response to a request from the second magnetic body inspection device 2.

In the first embodiment, as described above, the server 3 is configured to acquire the differential waveform DW with the detection signal DS at the time of the last inspection.

Further, the server 3 stores the first magnetic body information 10 as the specific information of the wire rope W in the specific information storage unit 31a at the time of producing the wire rope W. After that, the first magnetic body information 10 and the second magnetic body information 11 acquired at the time of the respective inspections are stored in the deterioration information storage unit 31b. That is, since the server 3 accumulates the deterioration information of the wire rope W as historical information, the magnetic body management system 100 can ensure the traceability of the wire rope W. Therefore, it is possible to acquire the change in the deterioration state of the wire rope W caused between the measurements. Therefore, it is possible to grasp at which stage the abnormality of the wire rope W has occurred.

Since the server 3 stores the waveform information of the detection signal DS (the second detection signal DS2) in the second magnetic body information 11 when damage has occurred in the wire rope W as the abnormality information 13, it can store the transition of the deterioration in the wire rope W and the waveform (the second detection signal DS2) when the anomaly has occurred. Therefore, the server 3 can accumulate the history information and the abnormality information 13 for a plurality of wire ropes W, so it is possible to grasp a sign that damage occurs in a certain wire rope W based on the history information and the abnormality information 13 in the plurality of wire ropes W. Further, by integrally analyzing the information on the load applied to the wire rope W and other information, it is possible to grasp a highly accurate sign. Further, based on a plurality of abnormality information 13, it is possible to perform updating of the algorithms for estimating the deterioration state of the wire rope W. For example, in a case where the server 3 estimates the deterioration state of the wire rope W using machine learning, it can accumulate data for machine learning, which enables updating of the learning model.

Further, in a case where the server 3 estimates damage by the shape fitting of the model waveform and the detection signal DS, it is possible to accumulate the waveform shapes when damage has occurred as the abnormality information 13. Therefore, it is possible to optimize the parameters of the model waveform. By optimizing the parameters of the model waveforms, in the server 3, in particular, the accuracy of the classification of the type of damage of the wire rope W can be improved.

(Deterioration State Estimation Processing In Magnetic Body Management System)

Figure 12:
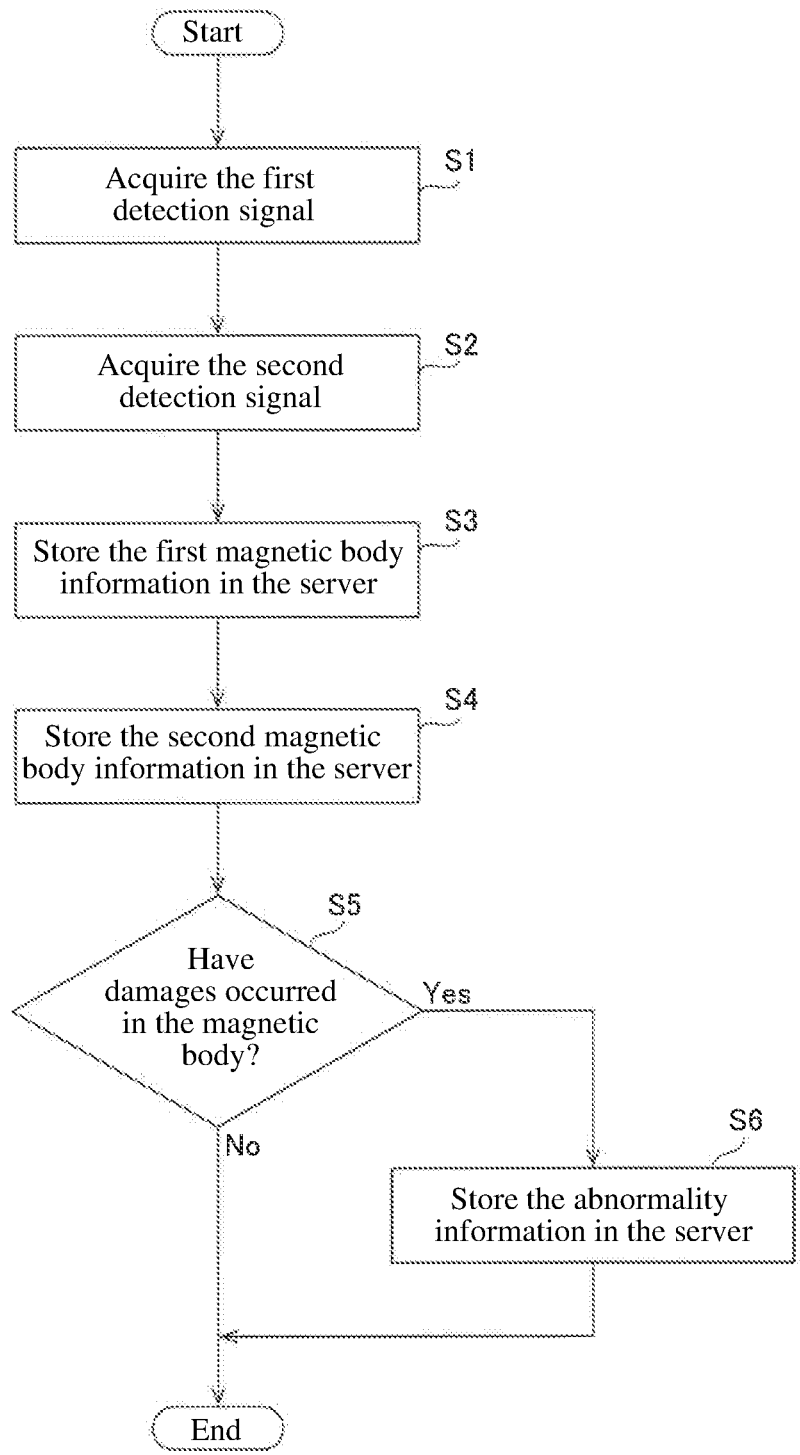
FIG. 12 is a flowchart for explaining the processing of estimating a deterioration state of a magnetic body by the magnetic body management system according to the first embodiment.

Next, referring to FIG. 12, the flow of the processing by which the magnetic body management system 100 estimates the deterioration state of the wire rope W will be described.

In Step S1, the first magnetic body inspection device 1 acquires the first detection signal DS1 based on the magnetic field of the wire rope W or the change in the magnetic field. Thereafter, in Step S2, the second magnetic body inspection device 2 acquires the second detection signal DS2 of the wire rope W by the same method as the acquisition of the first detection signal DS1 at the location of use of the wire rope W. Thereafter, the processing proceeds to Step S3.

In Step S3, the first magnetic body inspection device 1 stores the first magnetic body information 10 in which the first detection signal DS1 and the ID of wire rope W are linked in the server 3. Next, in Step S4, the second magnetic body inspection device 2 stores the second magnetic body information 11 in which the second detection signal DS2 and the ID of the wire rope W are linked in the server 3. Thereafter, processing proceeds to Step S5.

In Step S5, the server 3 estimates the deterioration state of the wire rope W. Specifically, the server 3 estimates the deterioration state of the wire rope W based on at least the first magnetic body information 10 and the second magnetic body information 11. In a case where damage has occurred in the wire rope W, the processing proceeds to Step S6. In a case where damage has not occurred in the wire rope W, the processing ends.

In Step S6, when estimated that damage has occurred in the wire rope W, the server 3 stores the waveform information of the second detection signal DS2 in the second magnetic body information 11 as the abnormality information 13 and ends the processing. The processing of Step S3 may be performed after the processing of Step S1. Further, the processing of Step S4 may be performed after the processing of Step S2. In the server 3, the processing of Step S3 and the processing of Step S4 may be performed at any timing as long as it is before the estimation of the deterioration state of the wire rope W.

(Deterioration Information Transmission Processing in Magnetic Body Management System)

Figure 13:
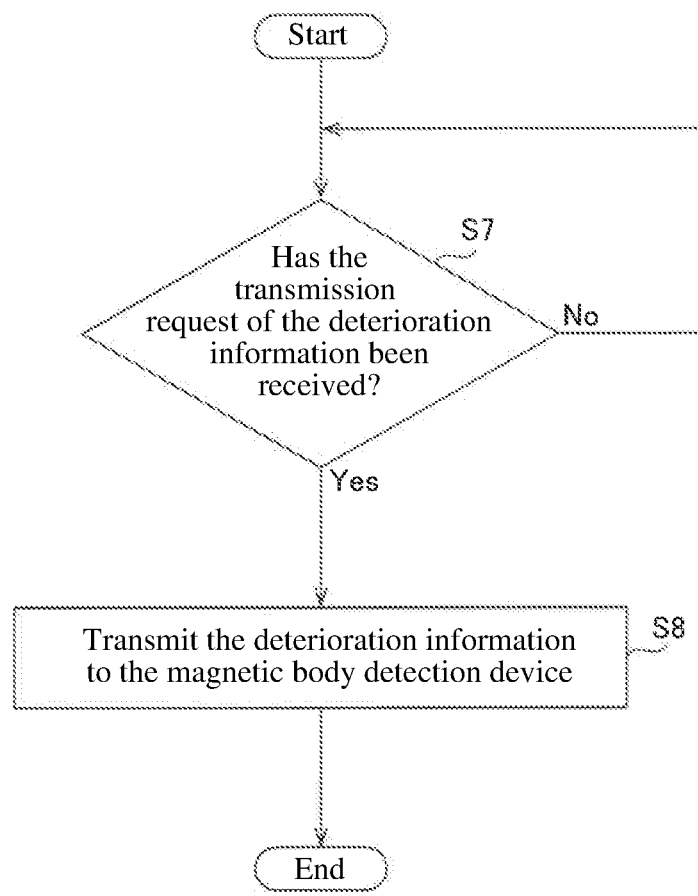
FIG. 13 is a flowchart for explaining the processing of transmitting deterioration information by the magnetic body management system according to the first embodiment.

Next, referring to FIG. 13, the processing in which the server 3 transmits the magnetic body deterioration information 12 will be described.

In Step S7, the server 3 checks whether or not a request for transmitting the magnetic body deterioration information 12 has been received from at least one of the first magnetic body inspection device 1 and the second magnetic body inspection device 2. In a case where a transmission request of the magnetic body deterioration information 12 has been received, the processing proceeds to Step S8. In a case where a transmission request of the magnetic body deterioration information 12 has not been received, the processing of Step S7 is repeated.

In Step S8, the server 3 transmits the magnetic body deterioration information 12 to the magnetic body inspection device that has transmitted the magnetic body deterioration information 12 and ends the processing.

Effects of First Embodiment

In this first embodiment, the following effects can be obtained.

In the first embodiment, as described above, the magnetic material management system 100 is provided with the first magnetic material inspection device 1 for acquiring the detection signal DS based on the magnetic field of the wire rope W or the change in the magnetic field at the shipping location of the wire rope W, the second magnetic body inspection device 2 of the same system as the first magnetic material inspection device 1 for acquiring the detection signal DS of the wire rope W at the location of use of the wire rope W, the server 3 for storing the information of the wire rope W, the first transmission unit 4 for transmitting the first magnetic body information 10 in which the detection signal DS acquired by the first magnetic material inspection device 1 and the identifier of the wire rope W are linked to the server 3, the second transmission unit 5 for transmitting the second magnetic body information 11 in which the detection signal DS acquired by the second magnetic body inspection device 2 and the identifier of the wire rope W are linked to the server 3. The server is configured to estimate the deterioration state of the wire rope W based on at least one of the first magnetic body information 10 and the second magnetic body information 11. Thus, at the shipping location and the location of use, it is possible to acquire the measurement data (the first magnetic body information 10 and the second magnetic body information 11) by using the first magnetic body inspection device 1 and the second magnetic body inspection device 2 of the same method. Therefore, it is possible to store not only the measurement data (second magnetic body information 11) at the location of use but also the measurement data (first magnetic body information 10) at the shipping location. As a result, it is possible to suppress the deterioration of the quality of the measurement data (first magnetic body information 10 and second magnetic body information 11) to be accumulated and it is also possible to suppress the deterioration of the accuracy of the state determination of the wire rope W. Further, it is possible to acquire consistent time-series data from the location of the shipment to the location of use, which makes it possible to acquire useful data that provides new insights for improving production, storing management, transportation, installation, and other processing.

Further, in the first embodiment, as described above, the server 3 is configured to estimate the deterioration state of the wire rope W by acquiring the differential waveform DW of the first magnetic body information 10 and the second magnetic body information 11. As a result, since the differential waveform DW of the first magnetic body information 10 and the second magnetic body information 11 are acquired, it is possible to acquire the change in the deterioration state of the wire rope W that has occurred during the transportation from the shipping location to the location of use. As a result, the change in the deterioration state of the wire rope W can be acquired at the shipping location, during the transportation, and at the location of use, so that the traceability of the wire rope W can be ensured.

Further, in the first embodiment, as described above, the server 3 is configured to store, as the abnormality information 13, the waveform information of the detection signal DS in the second magnetic body information 11 in a case where it is estimated that damage has occurred in the wire rope W when performing the estimation of the deterioration state of the wire rope W. With this, since it is possible to store the abnormality information 13, it is possible to update the algorithms in performing the estimation of the deterioration state of the wire rope W based on the accumulated abnormality information 13. Consequently, the estimation accuracy of the deterioration state of the wire rope W can be improved.

Further, in the first embodiment, as described above, it is further provided with the magnetic body information acquisition unit 33 for transmitting the deterioration information of the wire rope W including at least the differential waveform DW in response to a request from at least one of the first magnetic body inspection device 1 and the second magnetic body inspection device 2. With this, by requesting from the first magnetic body inspection device 1 and the second magnetic body inspection device 2 to the server 3, the first magnetic body inspection device 1 and the second magnetic body inspection device can acquire the differential waveform DW. As a result, at each of the shipping location and the location of use, it is possible to grasp the transition of the deterioration state of the wire rope W based on the differential waveform DW. Thus, it is possible to grasp at which timing the change in the deterioration state of the wire rope W has occurred.

Further, in the first embodiment, as described above, the first transmission unit 4 and the second transmission unit 5 are included in the first magnetic body inspection device 1 and the second magnetic body inspection device 2, respectively, and are configured to transmit at least the first magnetic body information 10 and the second magnetic body information 11 to the server 3 via the network N. With this, the first magnetic body information 10 and the second magnetic body information 11 can be transmitted directly from the first magnetic body inspection device 1 and the second magnetic body inspection device 2, respectively, to the server 3, thereby suppressing the complexity of the system configuration.

Further, in the first embodiment, as described above, the first magnetic body inspection device 1 and the second magnetic body inspection device 2 each include the magnetic field application unit 6 for aligning the magnetization direction of the wire rope W before detecting the detection signal DS, the detection unit 7 for outputting the detection signal DS whose magnetization direction has been aligned by the magnetic field application unit 6, the output unit 86 for outputting the detection signal DS, and the deterioration information acquisition unit 87 for acquiring the information of the deterioration state of the wire rope W. With this, since the first magnetic body inspection device 1 and the second magnetic body inspection device 2 are each provided with the magnetic field application unit 6, the noise of the detection signal DS is reduced. Thus, it is possible to improve the accuracy of the detection signal DS, and therefore it is possible to improve the reproducibility of the detection signal DS detected between the devices. As a result, since the acquired detection signal DS is highly reproducible, even in a case where the first magnetic body inspection device 1 and the second magnetic body inspection device 2, which are different devices, are used at remote locations, the effects of individual differences between the first magnetic body inspection device 1 and the second magnetic body inspection device 2 in the detection signals DS can be suppressed, and therefore the respective detection signals DS can be handled collectively.

Further, in the first embodiment, as described above, the magnetic field application unit 6 is configured to apply a magnetic field to the wire rope W so that the magnetization direction of the wire rope W is aligned with each other at the time of inspecting the wire rope W at the shipping location and at the time of inspecting the wire rope W at the location of use. With this, at the time of the inspection at the shipping location of the wire rope W and at the time of the inspection of the wire rope W at the location of use, it is possible to align the magnetization direction of the wire rope W. Thus, it is possible to suppress the occurrence of the difference other than the change in the deterioration state in the detection signal DS due to the fact that the magnetization direction of the wire rope W differs, so that it is possible to further improve the reproducibility of the wire rope. Consequently, the quality of the measurement data for estimating the deterioration state of the wire rope W can be further improved because the reproducibility of the measurement data can be further improved.

Further, in the first embodiment, as described above, the second magnetic body inspection device 2 is configured to acquire the detection signal DS immediately after being installed at the location of use. The server 3 is configured to estimate the deterioration state of the wire rope W based on the first magnetic body information 10 and the second magnetic body information 11 in which the detection signal DS acquired immediately after being installed at the location of use and the identifier of the wire rope W are linked. As a result, by acquiring the detection signal DS immediately after the start of use at the place where the wire rope W is actually used, it is possible to perform the alignment of the detection signals DS based on the measured length and the correction of the sampling pitch suitable for the actual use environment in the magnetic body information (the first magnetic body information 10) at the time of the production (before being installed at the location of use) and in the magnetic body information (the second magnetic body information 11) immediately after the start of use. Consequently, it is possible to improve the estimation accuracy of the deterioration state of the wire rope W in the server 3. Further, since the detection signal DS is acquired immediately after the start of use, the number of times of acquiring the detection signal DS until a periodic inspection is performed can be increased, as compared with a configuration in which the detection signal DS is not acquired immediately after the start of use and the detection signal DS is acquired before the wire rope W is installed at the location of use and after the wire rope W has been installed at the location of use. Consequently, it is possible to grasp the time when the deterioration state of the wire rope W has changed in more detail. Also, since the detection signal DS is acquired immediately after the start of use, for example, when used for an elevator E, by comparing with the deterioration state of the wire rope W before the start of use, it is possible to predict, for example, the breakage of the wire rope W due to the partial elongation of the wire rope W that occurs when the elevator E moves frequently between certain floors.

In the first embodiment, as described above, the magnetic body MM is a wire rope W. Thus, it is possible to provide a magnetic body management system 100 capable of suppressing the deterioration of the accuracy of the status determination of the wire rope W.

In the first embodiment, as described above, the identifier of the magnetic body MM includes a branch number ID for discriminating the position cut out to the predetermined length at the time of producing the wire rope W. As a result, it is possible to easily grasp that the wire rope W cut out to the predetermined length was cut at which position of the wire rope W before the wire rope W was cut out to the predetermined length. Therefore, even in a case where the wire rope W is cut out to the predetermined length and used after the production, it is possible to easily acquire the magnetic body information (the first magnetic body information 10) in the cut-out wire rope W. Consequently, the change in the deterioration state of the wire rope W can be easily grasped by acquiring the detection signal DS after the start of to use of the wire rope W cut out to a predetermined length.

In the first embodiment, as described above, the magnetic body management method includes Step S1 for acquiring the first detection signal DS1 based on the magnetic field of the wire rope W or the change in the magnetic field at the shipping location of the wire rope W, Step S2 for acquiring the second detection signal DS2 of the wire rope W at the location of use of the wire rope W by the same method as that of acquiring the first detection signal DS1, Step S3 for storing the first magnetic body information 10 in which the first detection signal DS1 and the identifier of of the wire rope W are linked in the in server 3, and Step S4 for storing the second magnetic body information 11 in which the second detection signal DS2 and the identifier of the wire rope are linked in the server 3, and Step S5 for estimating the deterioration state of the wire rope W based on at least one of the first magnetic body information 10 and the second magnetic body information 11. With this, in the same manner as in the magnetic body management system 100, it is possible to provide a magnetic body management system capable of suppressing the deterioration of the quality of the measurement data to be accumulated and also capable of suppressing the deterioration of the accuracy of the status determination of the wire rope.

Second Embodiment

Next, referring to FIG. 14, a magnetic body management system 200 according to a second embodiment of the present invention will be described. Unlike the first embodiment in which the first transmission unit 4 and the second transmission unit 5 are configured to be included in the first transmitter 40 and the second transmitter 41, respectively, in the second embodiment, the first transmission unit 4 and the second transmission unit 5 are configured to be included in the first transmitter 40 and the second transmitter 41. Note that the first transmitter 40 and the second transmitter 41 each are an example of the "device other than the first magnetic body inspection device 1 and the second magnetic body inspection device 2" recited in claims. Further note that the same configurations as those of the above-described first embodiment are denoted by the same reference numerals, and the descriptions thereof will be omitted.

Figure 14:
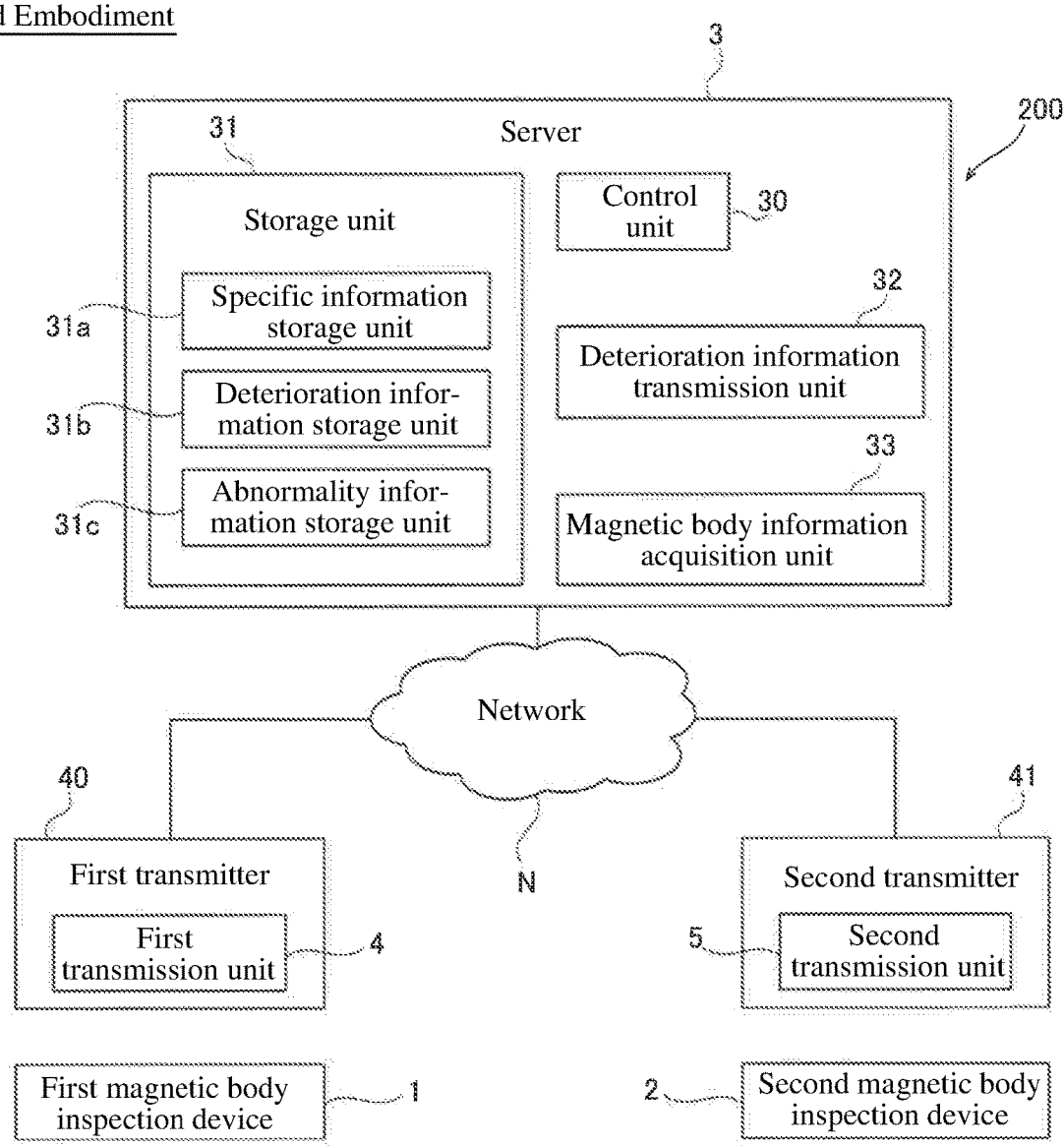
FIG. 14 is a schematic diagram showing an entire configuration of a magnetic body management system according to a second embodiment.

As shown in FIG. 14, in the magnetic body management system 200 according to the second embodiment, the first transmission unit 4 is included in the first transmitter 40. Further, the second transmission unit 5 is included in the second transmitter 41. The first transmitter 40 and the second transmitter 41 are each connected to the server 3 via the network N. The first transmitter 40 and the second transmitter 41 each include, for example, a personal computer.

In the second embodiment, the first magnetic body inspection device 1 is configured to transmit the first magnetic body information 10 to the server 3 via the first transmitter 40. The first magnetic body inspection device 1 and the first transmitter 40 may be connected by wire or wirelessly. Alternatively, the first magnetic body information 10 may be moved from the first magnetic body inspection device 1 to the first transmitter 40 by a portable storage medium, and the first magnetic body information 10 may be transmitted from the first transmitter 40 to the server 3 via the network N.

Further, the second magnetic body inspection device 2 is configured to transmit the second magnetic body information 11 to the server 3 via the second transmitter 41. The second magnetic body inspection device 2 and the second transmitter 41 may be connected by wire or wirelessly. Alternatively, the second magnetic body information 11 may be moved from the second magnetic body inspection device 2 to the second transmitter 41 by a portable storage medium, and the second magnetic body information 11 may be transmitted from the second transmitter 41 to the server 3 via the network N. Therefore, the second magnetic body inspection device 2 can be used to inspect a wire rope W of a crane provided on a ship or the like.

Effects of Second Embodiment

In this second embodiment, the following effects can be obtained.

In the second embodiment, as described above, the first transmission unit 4 and the second transmission unit 5 are included in the first transmitter 40 and the second transmitter 41 and configured to transmit at least the first magnetic body information 10 and the second magnetic body information 11 to the server 3 via the network N. With this, it is not required to provide the information transmission function (first transmission unit 4 and second transmission unit 5) to the first magnetic body inspection device 1 and the second magnetic body inspection device 2. Further, even at a place where they cannot be connected to the network N, the first transmission unit 4 and the second transmission unit 5 can be used. As a result, the flexibility of the magnetic body management system 200 can be improved.

The other effects of the second embodiment are the same as those of the above-described first embodiment.

Modifications

It should be understood that the embodiments disclosed here are examples in all aspects and are not restrictive. The scope of the present invention is indicated by the appended claims rather than by the description of the above-described embodiments and includes all modifications (changes) within the meanings and the scopes equivalent to the scope of claims.

For example, in the above-described first and second embodiments, an example is shown in which the first magnetic body inspection device 1 is arranged at the production location of the wire rope W as the shipping location, but the present invention is not limited thereto. For example, it may be configured such that the first magnetic body inspection device 1 is arranged in a warehouse or the like for storing the wire rope W after the production of the wire rope W and the first detection signal DS1 is acquired at the time of the shipment after a predetermined time has elapsed after the production. Further, it may be configured such that the first magnetic body inspection device 1 is arranged at a receiving department of the wire rope W or a processing department for performing the terminal processing of the wire rope W and the first detection signal DS1 is acquired at the time of the reception inspection or at the time of the shipment after the processing. In a case where there is a wire rope W at the shipping location, the first magnetic body inspection device 1 may acquire the first detection signal DS1 at any timing.

Further, in the above-described first and second embodiments, an example is shown in which the second magnetic body inspection device 2 is arranged to inspect the wire rope W installed on the elevator E, but the present invention is not limited thereto. For example, the second magnetic body inspection device 2 may be arranged to inspect the wire rope W installed on machinery, equipment, or infrastructures to which the wire rope W has been installed, such as, e.g., a material handling machine such as a crane, a conveyer machine, a construction machine, a moving device such as a ropeway, a gondola, an amusement device, a dam gate, and suspension bridge. The second magnetic body inspection device 2 may be arranged to perform an inspection before the use (before delivery) of the machine/equipment or infrastructure in which the wire rope W has been installed. Further, the second magnetic body inspection device 2 may be arranged to perform the inspection of the wire rope W at the maintenance department that inspects, maintains, replaces, etc., a wire rope W during or after the use at the time of performing the maintenance of the machine/equipment in which the wire rope W has been installed. In a case where the wire rope W is present at the location of use, the second magnetic body inspection device 2 may acquire the second detection signal DS2 at any timing.

Further, in the first and second embodiments, an example is shown in which the magnetic body MM is a wire rope W, but the present invention is not limited thereto. For example, the magnetic body MM may be a member such as a strand WS of the wire rope W, a thin plate, a squared member, a cylindrical pipe, a wire, a chain, and the like. Alternatively, the magnetic body may be a wire rope W coated with resin, plating, or the like. Further, it may be a cable or the like constituting the wire rope W.

Further, in the first and second embodiment, when applying a magnetic field in advance in the extending direction of the wire rope W (X-direction), the configuration of the magnetic field application unit 6 may be configured as shown in FIG. 15. Specifically, as shown in (A) of FIG. 15, a pair of the magnet 61 and the magnet 62 may be arranged so that the same poles are opposed to each other. Further, the magnet 63 and the magnet 64 may be arranged such that the same poles are opposed to each other. Further, as shown in (B) of FIG. 15, the arrangement direction of the magnetic field of the magnets 61 and 62 and that of the magnets 63 and 64 may not be parallel (respectively, the former is arranged in the Y-direction, and the latter is arranged in a direction inclined by an angle θ with respect to the Y-direction). Further, as shown in (C) of FIG. 15, it may be configured such that the magnets 61 and 62 (or, the magnet 63 and the magnet 64*d*) are arranged only on one side of the detection unit 7. Further, in the present invention, the magnetic field application unit 6 may be a cylindrical permanent magnet.

Further, in the first and second embodiments, an example is shown in which the magnetic field application unit 6 is configured by a permanent magnet, but the present invention is not limited thereto. In the present invention, the magnetic field application unit 6 may be constituted by an electromagnet (coil).

Further, in the above-described first and second embodiments, a configuration example is shown in which the receiving coils 71 and 72 as the differential coil 74 are arranged on the inner side of the excitation coil 73, but the present invention is not limited thereto. In the present invention, as shown in (A) of FIG. 16, the receiving coils 71 and 72 may be arranged at the outer side of the excitation coil 73. Further, as shown in (B) of FIG. 16, the receiving coils 71 and 72 may be arranged side by side on both sides of the excitation coil 73 in the X-direction (longitudinal direction) to sandwich the excitation coil 73. Further, as shown in (C) of FIG. 16, a single receiving coil 71 may be arranged on the inner side (or on the outer side) of the excitation coil 73. Further, as shown in (D) of FIG. 16, two excitation coils 73*a* and 73*b* may be arranged side by side on both sides of the receiving coil 71 in the X-direction (longitudinal direction) to sandwich a single receiving coil 71. As shown in (E) of FIG. 16, a single excitation coil 73 and a single receiving coil 71 may be arranged side by side in the X-direction (longitudinal direction). Further, as shown in (F) of FIG. 16, it may be configured such that the receiving coils 71 and 72 (or a single receiving coil 71) are arranged and the excitation coil 73 is omitted.

Further, in the above-described first embodiment, a configuration example is shown in which the first magnetic body inspection device 1 and the second magnetic body inspection device 2 include the first transmission unit 4 and the second transmission unit 5, respectively, but the present invention is not limited thereto. For example, one of the first magnetic body inspection device 1 and the second magnetic body inspection device 2 may be configured to be connected to the server 3 via the first transmitter 40 or the second transmitter 41, as shown in the second embodiment.

Further, in the above-described second embodiment, a configuration example is shown in which the first magnetic body inspection device 1 and the second magnetic body inspection device 2 are connected to the server 3 via the first transmitter 40 and the second transmitter 41, respectively, but the present invention is not limited thereto. For example, either one of the first magnetic body inspection device 1 and the second magnetic body inspection device 2 may be configured to be connected to the server 3 without through the first transmitter 40 and the second transmitter 41 as shown in the first embodiment. In a case where the second magnetic body inspection device 2 is arranged in a moving body, such as, e.g., a ship, as a location of use, a configuration in which the second magnetic body inspection device 2 is connected to the server 3 via the second transmitter 41 is preferable.

Further, in the above-described first and second embodiments, a configuration example is shown in which it is determined whether or not damage has occurred in the wire rope W by estimating the deterioration state of the wire rope W in the server 3, but the present invention is not limited thereto. For example, it may be configured such that it is determined whether or not there is damage in the wire rope W when the detection signal DS is acquired in the first magnetic body inspection device 1 and the second magnetic body inspection device 2. Further, it may be configured such that the first magnetic body inspection device 1 and the second magnetic body inspection device 2 perform only the determination of the presence or absence of damage of the wire rope W, and the server 3 determines the number of damages of the wire rope W and the type of each damage as a detail analysis. In a case where the server 3 determines the type of damage of the wire rope W, it may be configured such that the server 3 determines the type of damage occurred in the wire rope W based on the shape of the waveform of the differential waveform DW of the first detection signal DS1 and the second detection signal DS2.

Further, in the above-described first and second embodiments, a configuration example is shown in which the detection signal DS of the wire rope W is acquired at the time (t1) of the production by the first magnetic body inspection device 1 and then the detection signal DS of the wire rope W is acquired at the time (t2) of the shipment, but the present invention is not limited thereto. The first magnetic body inspection device 1 may be configured to acquire the detection signal DS of the wire rope W either at the time (t1) of the production or at the time (t2) of the shipment.

Further, in the above-described first and second embodiments, a configuration example is shown in which the first magnetic body inspection device 1 and the second magnetic body inspection device 2 transmit the transmission request of the magnetic body deterioration information 12 when transmitting the first magnetic body information 10 and the second magnetic body information 11 from the time (t2) of the shipment to the time (tn) of the periodic inspection, but the present invention is not limited thereto. For example, the first magnetic body inspection device 1 and the second magnetic body inspection device 2 may not transmit a request for transmitting the magnetic body deterioration information 12 at the time of transmitting the first magnetic body information 10 and the second magnetic body information 11. The request to transmit the magnetic body deterioration information 12 may be transmitted at any time when it is desired to acquire the magnetic body deterioration information 12.

Further, in the above-described first and second embodiments, a configuration example is shown in which the differential waveform DW with the detection signal DS at the time of the last inspection, such as, e.g., the magnetic body deterioration information 12 between the time (t1) of the production and the time (t2) of the shipment (t2), or the magnetic body deterioration information 12 between the time (t3) of the start of use and the time (t2) of the shipment, but the present invention is not limited thereto. The detection signal DS for acquiring the differential waveform DW may use the detection signal DS acquired at any timing.

Further, in the above-described first and second embodiments, an example is shown in which as the first magnetic body information 10, the ID of the wire rope W, the length of the wire rope W, the diameter of the wire rope W, the date and time when the first detection signal DS1 was acquired, and the first detection signal DS1 are included, but the present invention is not limited thereto. For example, the first magnetic body information 10 may include, in addition to the length of the wire rope W and the diameter of the wire rope W, the configuration of the wire rope W (indicating how the members such as strands WS are twisted), the destination information, or the like. Any information relating to the wire rope W may be included in the first magnetic body information 10.

Further, in the above-described first and second embodiments, a configuration example is shown in which the wire rope W is periodically inspected by the second magnetic body inspection device 2, but the present invention is not limited thereto. For example, the second magnetic body inspection device 2 may be configured to inspect the wire rope W each time or monitor it at all times.

Further, in the above-described first and second embodiments, a configuration example is shown in which the server 3 estimates the deterioration state of the wire rope W by acquiring the differential waveform DW, but the present invention is not limited thereto. The server 3 may be configured to estimate the deterioration state of the wire rope W without acquiring the differential waveform DW. For example, the server 3 may be configured to estimate the deterioration state of the wire rope W by using the second detection signal DS2. Further, it may be configured, for example, to estimate the deterioration state not from the differential waveform DW but from the difference in the correlation coefficient.

Further, in the first and second embodiments, a configuration example is shown in which the server 3 stores the abnormality information 13, but the present invention is not limited thereto. The server 3 may not be required to store the abnormality information 13.

Further, in the above-described first and second embodiments, a configuration example is shown in which the server 3 is provided with the deterioration information transmission unit 32, but the present invention is not limited thereto. In a case where the server 3 does not transmit the magnetic body deterioration information 12 to the first magnetic body inspection device 1 and the second magnetic body inspection device 2, it may not include the deterioration information transmission unit 32.

Further, in the above-described first and second embodiments, a configuration example is shown in which the server 3 is connected to the first magnetic body inspection device 1 and the second magnetic body inspection device 2 via the network N, but the present invention is not limited thereto. For example, it may be configured such that the first magnetic body information 10 and the second magnetic body information 11 are stored in a portable storage medium and may be directly stored in the storage unit 31 of the server 3.

Further, in the above-described first and second embodiments, a configuration example is shown in which the server 3 estimates the deterioration state of the wire rope W by the differential waveform DW, but the present invention is not limited thereto. For example, the server 3 may be configured to estimate the deterioration state of the wire rope W by the second detection signal DS2. However, as compared with the determination by the second detection signal DS2, the determination by the differential waveform DW detects only the peak P due to the change (damage) in the deterioration state of the wire rope W, the change in the deterioration state of the wire rope W (damage) can be grasped at a glance. Therefore, it is preferable to adopt the configuration of estimating the deterioration state (damage) of the wire rope W by the differential waveform DW.

Further, in the above-described first and second embodiments, a configuration example is shown in which the server 3 transmits the magnetic body deterioration information 12 in response to a transmission request from at least one of the first magnetic body inspection device 1 and the second magnetic body inspection device 2, but the present invention is not limited to this configuration. It may be configured such that information required for business is transmitted from the first magnetic body inspection device 1, the second magnetic body inspection device 2, and the server 3 in response to a transmission request from a terminal (such as a tablet computer, a maintenance tool such as a smartphone, or a personal computer) used for business by an operator at the shipping location or at the location of use, a maintenance manager, an owner, or an user of a machine, a device, or an infrastructure in which the wire rope W has been installed.

DESCRIPTION OF SYMBOLS

1: First magnetic body inspection device
2: Second magnetic body inspection device
3: Server
4: First transmission unit
5: Second transmission unit
6: Magnetic field application unit
7: Detection unit
10: First magnetic body information
11: Second magnetic body information
12: Magnetic body deterioration information
13: Abnormality information
32: Deterioration information transmission unit
33: Magnetic body information acquisition unit
40: First transmitter (a device other than the first magnetic body inspection device and the second magnetic body inspection device)
41: Second transmitter (a device other than the first magnetic body inspection device and the second magnetic body inspection device)
86: Output unit
87: Deterioration information acquisition unit
100, 200; Magnetic body management system
DS: Detection signal
DS1: First detection signal
DS2: Second detection signal
MM: Magnetic body
W: Wire rope (magnetic body)

The invention claimed is:

1. A magnetic body management system comprising:
a first magnetic body inspection device configured to acquire a detection signal based on a magnetic field of a magnetic body or a change in the magnetic field before the magnetic body is installed at a location of use;
a second magnetic body inspection device configured to acquire the detection signal of the magnetic body after the magnetic body has been installed at the location of use, the second magnetic body inspection device having the same method as that of the first magnetic body inspection device;
a server configured to store information of the magnetic body;
a first transmission unit configured to transmit first magnetic body information in which the detection signal acquired by the first magnetic body inspection device and an identifier of the magnetic body are linked; and
a second transmission unit configured to transmit second magnetic body information in which the detection signal acquired by the second magnetic body inspection device and the identifier of the magnetic body are linked,
wherein the server is configured to estimate a deterioration state of the magnetic body based on at least the first magnetic body information and the second magnetic body information.

2. The magnetic body management system as recited in claim 1,
wherein the server is configured to estimate the deterioration state of the magnetic body by acquiring a differential waveform of the first magnetic body information and the second magnetic body information.

3. The magnetic body management system as recited in-claim 1,
wherein the server is configured to store, when estimating the deterioration state of the magnetic body, waveform information of the detection signal in the second magnetic body information when it is estimated that damage has occurred in the magnetic body as abnormality information.

4. The magnetic body management system as recited in claim 2,
wherein the server further includes a deterioration information transmission unit for transmitting the deterioration information of the magnetic body including at least the differential waveform, in response to a request from at least one of the first magnetic body inspection device and the second magnetic body inspection device.

5. The magnetic body management system as recited in-claim 1,
wherein the first transmission unit and the second transmission unit are included in the first magnetic body inspection device and the second magnetic body inspection device, respectively, or included in a device other than the first magnetic body inspection device and the second magnetic body inspection device, and are configured to transmit at least the first magnetic body information and the second magnetic body information, respectively, to the server via a network.

6. The magnetic body management system as recited in-claim 1,
wherein the first magnetic body inspection device and the second magnetic body inspection device each include:
a magnetic field application unit configured to align a magnetization direction of the magnetic body before performing detection of the detection signal;
a detection unit configured to output the detection signal in which the magnetization direction is aligned by the magnetic field application unit;
an output unit configured to output the detection signal; and
a deterioration information acquisition unit configured to acquire information of the deterioration state of the magnetic body.

7. The magnetic body management system as recited in claim 6,
wherein the magnetic field application unit is configured to apply a magnetic field to the magnetic body so that the magnetization direction of the magnetic body is aligned with each other at the time of inspecting the magnetic body at a shipping location and at the time of inspecting the magnetic body at the location of use.

8. The magnetic body management system as recited in claim 1,
wherein the second magnetic body inspection device is configured to acquire the detection signal immediately after the magnetic body has been installed at the location of use, and
wherein the server is configured to estimate the deterioration state of the magnetic body, based on the first magnetic body information and the second magnetic body information in which the detection signal acquired immediately after the magnetic body has been installed at the location of use and the identifier of the magnetic body are linked.

9. The magnetic body management system as recited in-claim 1,
wherein the magnetic body is a wire rope.

10. The magnetic body management system as recited in claim 9,
   wherein the identifier of the magnetic body includes an identifier for identifying a portion cut out to a predetermined length at the time of producing the wire rope.

11. A magnetic body management method comprising:
   acquiring, at a shipping location of a magnetic body, a first detection signal based on a magnetic field of the magnetic body or a change in the magnetic field;
   acquiring, at a location of use of the magnetic body, a second detection signal of the magnetic body by the same method as a method for acquiring the first detection signal;
   storing first magnetic body information in which the first detection signal and an identifier of the magnetic body are linked in a server;
   storing second magnetic body information in which the second detection signal and the identifier of the magnetic body are linked in the server; and
   estimating a deterioration state of the magnetic body based on at least the first magnetic body information and the second magnetic body information.

\* \* \* \* \*